United States Patent
Langhammer et al.

(10) Patent No.: US 11,003,446 B2
(45) Date of Patent: May 11, 2021

(54) REDUCTION OPERATION MAPPING SYSTEMS AND METHODS

(71) Applicant: Intel Corporation, Santa Clara, CA (US)

(72) Inventors: Martin Langhammer, Alderbury (GB); Gregg William Baeckler, San Francisco, CA (US); Bogdan Pasca, Toulouse (FR)

(73) Assignee: Intel Corporation, Santa Clara, CA (US)

( * ) Notice: Subject to any disclaimer, the term of this patent is extended or adjusted under 35 U.S.C. 154(b) by 586 days.

(21) Appl. No.: 15/842,343

(22) Filed: Dec. 14, 2017

(65) Prior Publication Data

US 2019/0018673 A1 Jan. 17, 2019

Related U.S. Application Data

(60) Provisional application No. 62/532,871, filed on Jul. 14, 2017.

(51) Int. Cl.
| | | |
|---|---|---|
| *G06F 5/01* | (2006.01) | |
| *G06F 7/499* | (2006.01) | |
| *G06F 7/509* | (2006.01) | |
| *G06F 7/485* | (2006.01) | |
| *G06F 9/30* | (2018.01) | |

(52) U.S. Cl.
CPC ............ *G06F 9/3001* (2013.01); *G06F 5/012* (2013.01); *G06F 7/49915* (2013.01); *G06F 7/509* (2013.01); *G06F 7/485* (2013.01)

(58) Field of Classification Search
CPC .. G06F 5/01–012; G06F 7/485; G06F 7/4876; G06F 7/49915; G06F 7/49936–49942; G06F 7/50; G06F 7/505; G06F 7/509; G06F 7/523; G06F 7/53; G06F 7/5324; G06F 2207/4922
See application file for complete search history.

(56) References Cited

U.S. PATENT DOCUMENTS

| | | | | |
|---|---|---|---|---|
| 8,639,738 B2* | 1/2014 | Liao | ....................... | G06F 7/523 708/551 |
| 2002/0032713 A1* | 3/2002 | Jou | ......................... | G06F 7/523 708/625 |
| 2003/0220956 A1* | 11/2003 | Parhi | ................... | G06F 7/49942 708/620 |
| 2005/0144217 A1* | 6/2005 | Parhi | ................... | G06F 7/49947 708/625 |

OTHER PUBLICATIONS

S. Balamurugan, Balakumaran Srirangaswamy, R. Marimuthu, and P. S. Mallick, "FPGA design and implementation of truncated multipliers using bypassing technique", Proceedings of the International Conference on Advances in Computing, Communications and Informatics (ICACCI '12), pp. 1111-1117, 2012 (Year: 2012).*
B. K. Mohanty, "Efficient Fixed-Width Adder-Tree Design", IEEE Transactions on Circuits and Systems—II: Express Briefs, vol. 66, No. 2, Feb. 2019 (Year: 2019).*

\* cited by examiner

*Primary Examiner* — Matthew D Sandifer
(74) *Attorney, Agent, or Firm* — Fletcher Yoder, P.C.

(57) ABSTRACT

Adder trees may be constructed for efficient packing of arithmetic operators into an integrated circuit. The operands of the trees may be truncated to pack an integer number of nodes per logic array block. As a result, arithmetic operations may pack more efficiently onto the integrated circuit while providing increased precision and performance.

13 Claims, 16 Drawing Sheets

REDUCTION OPERATION MAPPING SYSTEMS AND METHODS

CROSS REFERENCE TO RELATED APPLICATIONS

This application is a Non-Provisional Application claiming priority to U.S. Provisional Patent Application No. 62/532,871, entitled "Reduction Operation Mapping Systems and Methods," filed Jul. 14, 2017, which is herein incorporated by reference.

BACKGROUND

The present disclosure generally relates to integrated circuit devices and, more particularly, to increasing the efficiency of mapping reduction operations (e.g., summation of multiple operands) onto programmable devices (e.g., field-programmable gate array (FPGA) devices). In particular, the current disclosure relates to small precision multiplication based dot products for machine learning operations.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Machine learning is becoming an increasingly valuable application area. For example, it may be utilized in natural language processing, object recognition, bioinformatics, and economics, among other fields and applications. Implementations of machine learning may involve large arithmetic operations, such as the summation of many operands. However, large arithmetic operations are difficult to fit into integrated circuits (e.g., FPGAs), which may implement machine learning. Fitting arithmetic operations onto an integrated circuit may, for example, be especially difficult when the operands have a high precision, there are many operands to sum, and/or there is a high percentage of logic used in the device for the arithmetic operations. As such, the summation of the many operands that may be involved in machine learning may involve a large portion of the integrated circuit's area. To that end, because of the physical layout and the manner in which logic resources may be utilized in such designs, the usable logic for dense arithmetic designs may be restricted. For example, in some arithmetic designs, soft logic resources, which contain adder resources (e.g., adders) to perform arithmetic functions, are often grouped together. As such, if a ripple carry adder used for a particular node in an adder tree takes up more than half the soft logic group, the remaining logic in the group might not be available for similar nodes. Thus, much of the logic in the integrated circuit may be unreachable.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Machine learning has become a valuable use case for integrated circuits (e.g., field programmable gate arrays, also known as FPGAs) and may utilize one or more arithmetic operations (e.g., reduction operations). To perform an arithmetic operation, an integrated circuit may contain a logic array block (LAB) that may include a number of adaptive logic modules (ALM) and/or other logic elements. The ALMs may include resources, such as a variety of look-up tables (LUT), adders, carry chains, and the like, so that each ALM, and subsequently the LAB including the ALMs, may be configured to implement the arithmetic function. As such, a machine learning implementation, for example, may utilize an FPGA with a LAB in order to perform a number of arithmetic operations. In such cases, the LAB may sum multiple operands, using its ALM resources. Further, although operand sizes involved in machine learning are generally relatively small, many parallel reduction operations may be implemented, which may utilize a large portion of the integrated circuit.

As such, in accordance with certain embodiments of the present disclosure, adder trees may be constructed for efficient packing of arithmetic operators into integrated circuits. The operands of the trees may be truncated (e.g., pruned) to pack an integer number of nodes per logic array block. Further, the techniques described herein further provide mechanisms for determining likely error, as well as hardware structures to automatically mitigate error, involved with truncating the operands. As a result, arithmetic operations may pack more efficiently onto an integrated circuit with increased precision and performance.

Figure 1:
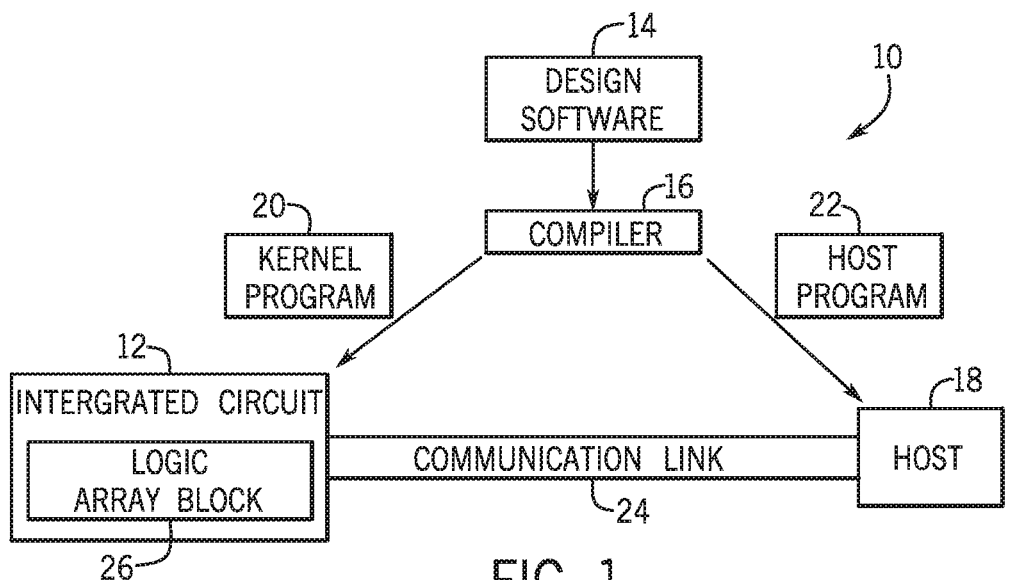
FIG. 1 is a block diagram of a system for implementing arithmetic operations, in accordance with an embodiment.

With the foregoing in mind, FIG. 1 illustrates a block diagram of a system 10 that implements arithmetic operations. A designer may desire to implement functionality on an integrated circuit 12, which may include, for example, an FPGA, an application-specific integrated circuit (ASIC), a system-on-chip (SoC), or the like. The designer may specify a program to be implemented, which may enable the designer to provide programming instructions to implement a circuit design for the integrated circuit 12. For example, the designer may specify that the programming instructions configure or partially reconfigure a region of the integrated circuit 12.

The designer may implement a design using design software 14, such as a version of Quartus by Intel Corporation. The design software 14 may use a compiler 16 to convert the program into a low-level program. The compiler 16 may provide machine-readable instructions representative of the program to a host 18 and the integrated circuit 12. In an example wherein the integrated circuit 12 includes FPGA fabric, the integrated circuit 12 may receive one or more kernel programs 20 which describe the hardware implementations that should be programmed into the programmable fabric of the integrated circuit. The host 18 may receive a host program 22 which may be implemented by the kernel programs 20. To implement the host program 22, the host 18 may communicate instructions from the host program 22 to the integrated circuit 12 via a communications link 24, which may be, for example, direct memory access (DMA) communications or peripheral component interconnect express (PCIe) communications. In some embodiments, the kernel programs 20 and the host 18 may enable configuration of a LAB 26 on the integrated circuit 12. The LAB 26 may include a number of ALMs and/or other logic element and may be configured to implement the arithmetic functions.

Figure 2:
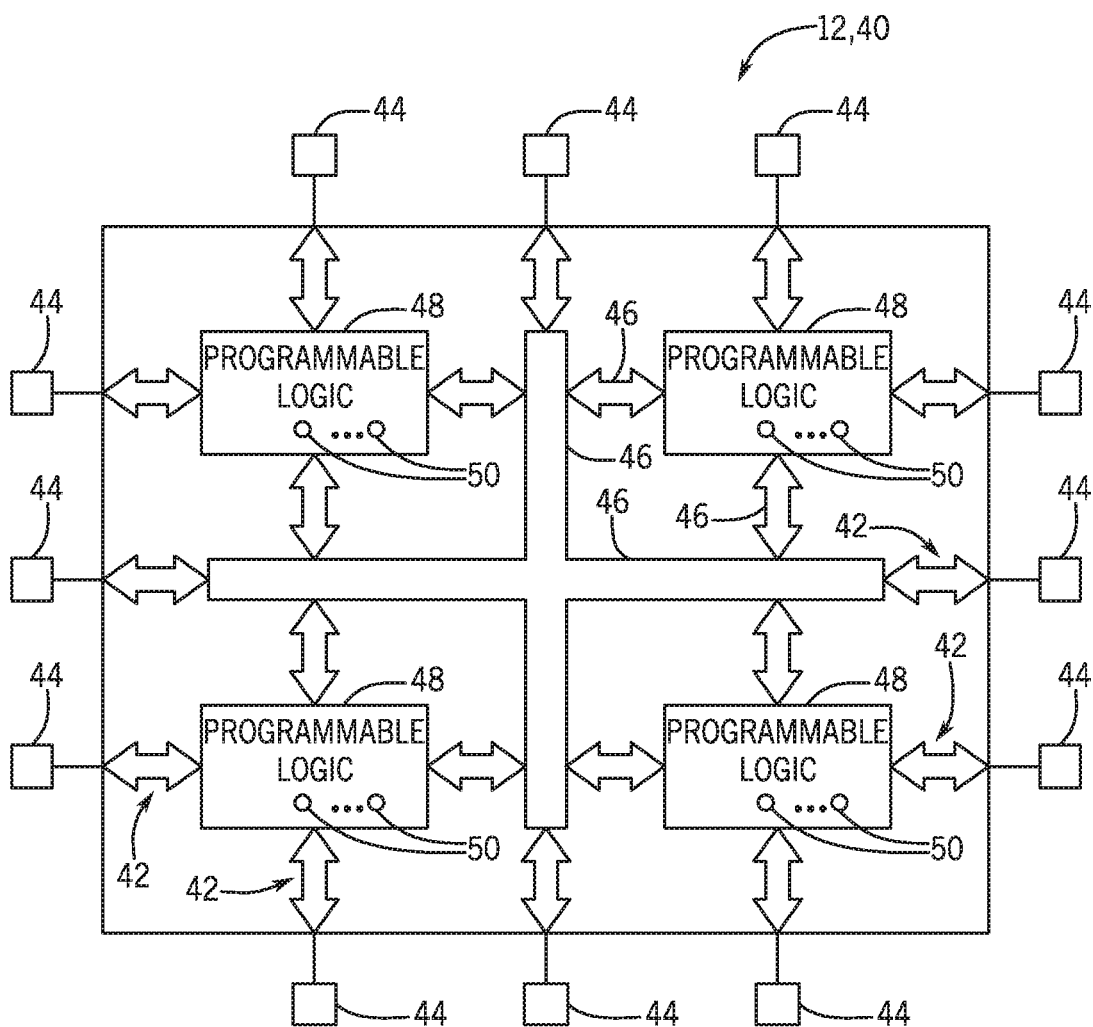
FIG. 2 is a block diagram of an integrated circuit where arithmetic operations may be implemented, in accordance with an embodiment.

In one example, shown in FIG. 2, the integrated circuit 12 may include a programmable logic device, such as a field-programmable gate array (FPGA) 40. For the purposes of this example, the device is referred to as an FPGA 40, though it should be understood that the device may be any type of logic device (e.g., an application-specific integrated circuit (ASIC) and/or application-specific standard product (ASSP)). As shown, FPGA 40 may have input/output circuitry 42 for driving signals off FPGA 40 and for receiving signals from other devices via input/output pins 44. Interconnection resources 46, such as global and local vertical and horizontal conductive lines and buses, may be used to route signals on FPGA 40. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48.

Programmable logic devices, such as FPGA 40, may contain programmable elements 50 with the programmable logic 48. For example, as discussed above, a designer (e.g., a customer) may program (e.g., configure) the programmable logic 48 to perform one or more desired functions. By way of example, the FPGA 40 may be programmed by configuring the programmable elements 50 using mask programming arrangements, which is performed during semiconductor manufacturing. In another example, the FPGA 40 may be configured after semiconductor fabrication operations have been completed, such as by using electrical programming or laser programming to program the programmable elements 50. In general, the programmable elements 50 may be based on any suitable programmable technology, such as fuses, antifuses, electrically-programmable read-only-memory technology, random-access memory cells, mask-programmed elements, and so forth.

The FPGA 40 may be electrically programmed. With electrical programming arrangements, the programmable elements 50 may be formed from one or more memory cells. For example, during programming, configuration data is loaded into the memory cells using input/output pins 44 and input/output circuitry 42. In one embodiment, the memory cells may be implemented as random-access-memory (RAM) cells. The use of memory cells based on RAM technology is described herein is intended to be only one example. Further, because these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

The circuitry of FPGA 40 may be organized using any suitable architecture. As an example, the logic of FPGA 40 may be organized in a series of rows and columns of larger programmable logic regions, each of which may contain multiple smaller logic regions. The logic resources of FPGA 40 may be interconnected by interconnection resources 46 such as associated vertical and horizontal conductors. For example, in some embodiments, these conductors may include global conductive lines that span substantially all of FPGA 40, fractional lines such as half-lines or quarter lines that span part of FPGA 40, staggered lines of a particular length (e.g., sufficient to interconnect several logic areas), smaller local lines, or any other suitable interconnection resource arrangement. Moreover, in further embodiments, the logic of FPGA 40 may be arranged in more levels or layers in which multiple large regions are interconnected to form still larger portions of logic. Still further, other device arrangements may use logic that is not arranged in a manner other than rows and columns.

Figure 3:
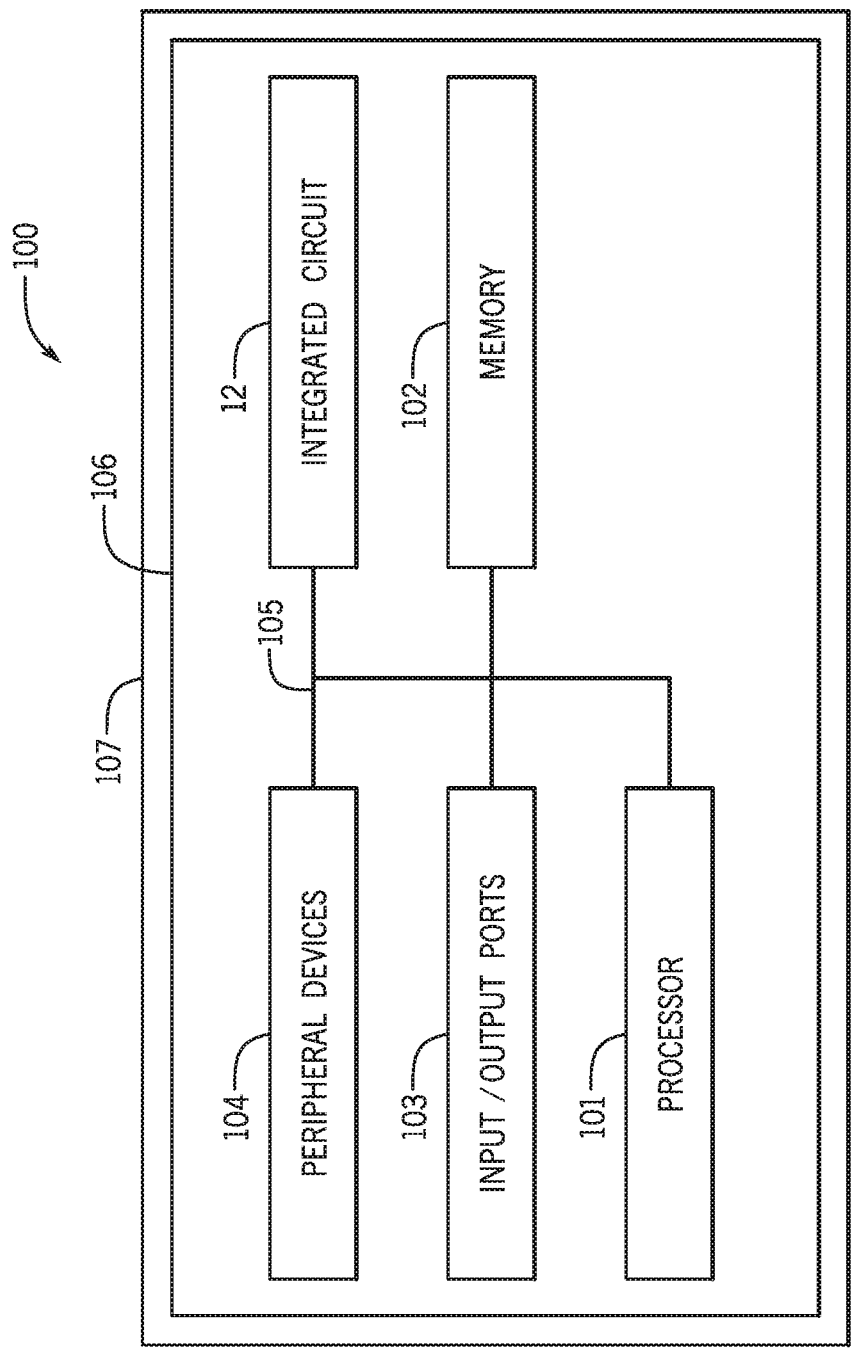
FIG. 3 is a block diagram of a data processing system, where an integrated circuit may be implemented, in accordance with an embodiment.

FIG. 3 displays a data processing system 100, which may be an example of one of the many electronic devices an integrated circuit 12, such as FPGA 40, may be used in. The data processing system 100 may include a processor 101, memory 102, input/output (I/O) ports 103, peripheral devices 104, and/or additional or fewer components. The components in data processing system 100 may be coupled together by a system bus 105 and populated on a circuit board 106, which may be contained in an end-user system 107.

Data processing system 100 may be used in an array of applications. For example, it may be used in computer or data networking, instrumentation, video or digital signal processing, or in other applications that may find programmable logic advantageous. The integrated circuit 12 may be used within the data processing system 100 to perform logic functions. The integrated circuit 12 may be configured as a processor or controller that may cooperate with processor 101, and/or the integrated circuit 12 may interface between processor 101 and other components in the data processing system 100, among other examples.

Figure 4:
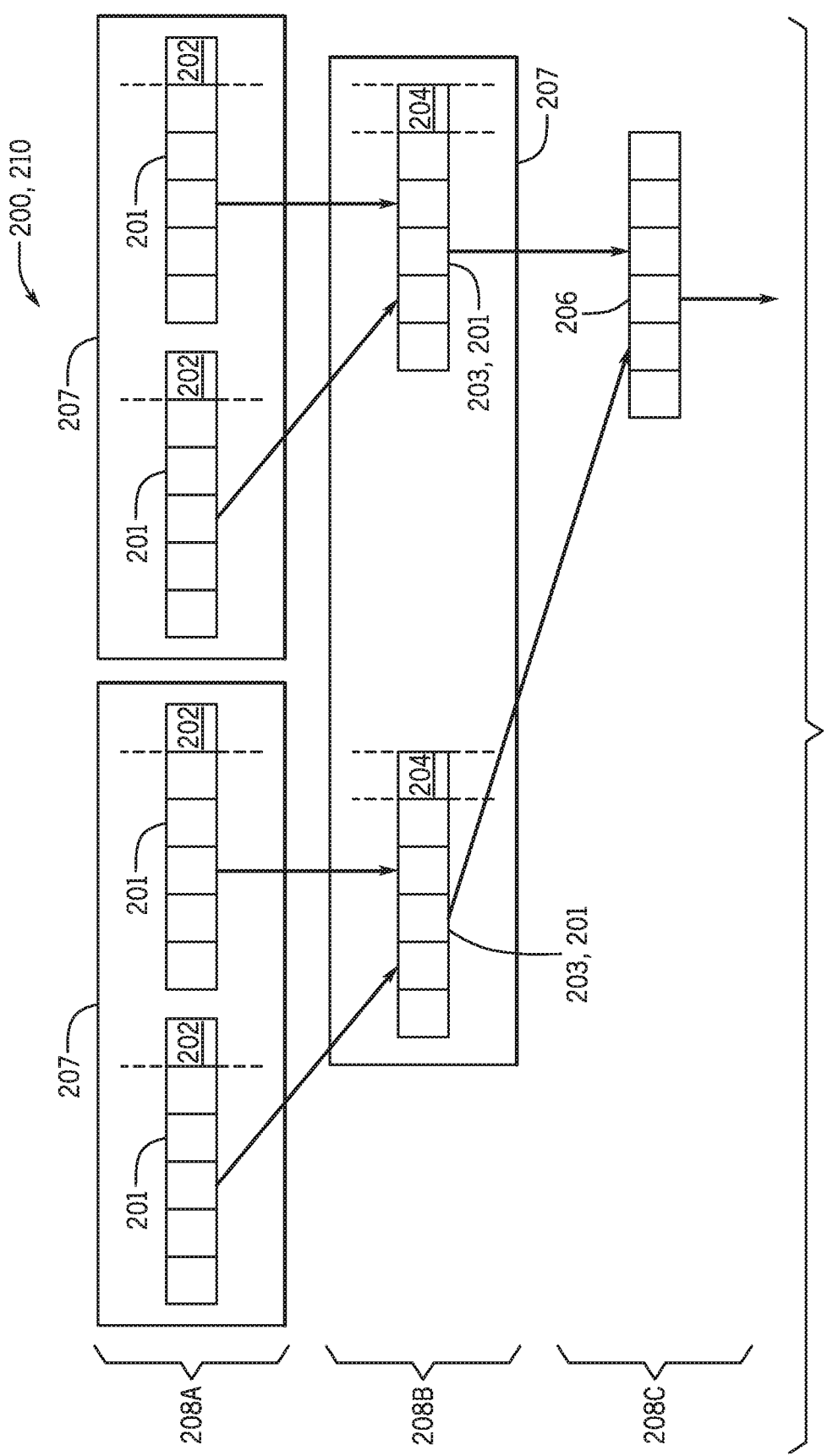
FIG. 4 is a block diagram of an adder tree, in which the arithmetic operations may be performed, in accordance with an embodiment.

Turning now to FIG. 4, in some embodiments, an ALM and/or LAB 26 may perform the summation of multiple operands via an adder tree 200, which may sum operands 201 at several nodes 207 and/or stages 208 until a final sum is generated. In the illustrated embodiment, for example, a first adder tree 210 may include input circuitry to receive four operands 201 in a first stage 208A that are eventually summed to a final sum 206. The operands 201 may be paired together at two nodes 207 to form two sets of operands that a set of adders (e.g., adder circuitry) may separately sum into two intermediate results 203. An additional adder may sum the two intermediate results 203 at a single node 207 in a second stage 208B of the first adder tree 210 into the final sum 206 in a third stage 208C of the first adder tree 210 to complete the arithmetic operation of summing all four of the operands 201. While adders are not shown in the illustrated embodiment, it should be understood that a result (e.g., 203, 206) of summing two or more operands 201 may be obtained by using an adder (e.g., adder circuitry).

The addition of two operands 201 may generate a result with a greater number of bits than either of the operands 201. For example, the addition of a first 6-bit operand and a second 6-bit operand may generate a 7-bit result if the addition involves a carry operation that impacts a most significant bit (MSB) of either the first 6-bit operand or the second 6-bit operand. As such, in some cases, each of the intermediate results 203 and the final sum 206 of an adder tree 200 may contain additional bits compared to the operands 201 in a previous stage (e.g., 208A, 208B). For example, an adder tree 200 with several stages may generate a final sum 206 having more bits than any of a set of operands 201 input to the adder tree 200. Thus, the growth of the results of the arithmetic operations in the adder tree may involve the use of additional resources and/or space on an integrated circuit 12 and may further negatively impact the packing efficiency of the integrated circuit 12.

Therefore, in some embodiments, to control the growth of the results of an arithmetic operation, and therefore packing, the operands 201 at each stage (e.g., 208A-208C) or a subset of the stages 208 may be truncated (e.g., pruned). For example, by truncating operands 201 in the first adder tree 210, the adder tree 200 may pack more efficiently onto the integrated circuit 12. In the illustrated embodiment, for example, each of the operands 201 are 6-bits wide, and the 6-bit size is carried forward through the first adder tree 210. As such, in the illustrated embodiment, each of the intermediate results 203 and the final sum 206 are also 6-bits wide. To facilitate the constant 6-bit size, a least significant bit (LSB) (e.g., 202, 204) of each operand 201 may be dropped. For example, soft logic circuitry (e.g., logic within the LAB) may right-shift the operands 201 by a bit to truncate the LSBs. That is, in the example shown in FIG. 4, only the upper five bits of each operand 201 may be used, resulting in the addition of two 5-bit operands 201 at each stage (e.g., 208A, 208B) of the first adder tree 210. As such, the intermediate results 203 in the second stage 208B have a 6-bit size because, as discussed, the arithmetic operation may result in a result with a single bit growth. Thus, an LSB 204 of each of the intermediate results 203 may also be truncated before the addition operation at the second stage 208B occurs. The final sum 206, therefore, may have a 6-bit width. Accordingly, first adder tree 210 is an illustrative example of single bit pruned reduction tree, as a single bit is removed (e.g., pruned) from each operand 201 at each stage 208.

As an additional illustrative example, an 8-bit by 3-bit signed multiplier, which may be used in machine learning implementations, may have a signed output range of 10 bits. Accordingly, an input precision of an adder tree used to generate a product of the 8-bit by 3-bit signed multiplier may be 10 bits. In some embodiments, because 20 adder bits are a logic grouping in an integrated circuit 12, maintaining 10 bits per each operand 201 at an adder node 207 may allow two nodes 207 to be packed into each routing group (e.g., soft logic group). As such, to maintain 10 bits per each operand 201 and to generate a final sum having a 10-bit width, each operand 201 at each node 207 of the adder tree may be right shifted by a single bit (e.g., truncated), which may address growth of a single bit in a sum output by a node 207.

Figure 5:
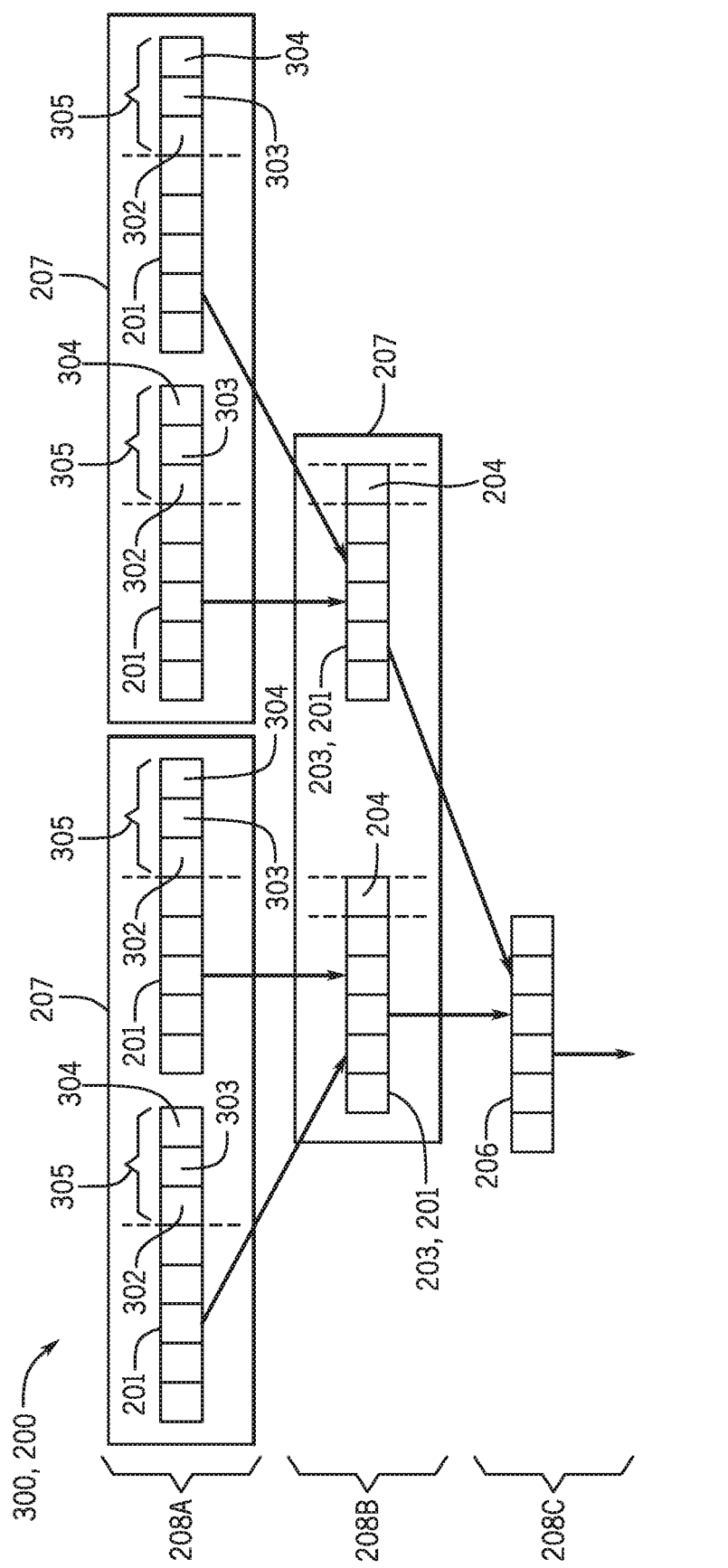
FIG. 5 is a block diagram of a second embodiment of an adder tree.

In other embodiments, truncation may involve the removal of an LSB group 305 (e.g., set of two or more LSBs) instead of or in addition to removing a single LSB. For example, in some embodiments, a second adder tree 300 may include input circuitry to receive operands 201 with many bits (e.g., large operands), as FIG. 5 may illustrate. As such, to improve packing efficiency, soft logic, for example, may truncate an LSB group 305 (e.g., 302-304) from each of the operands 201. For example, the second adder tree 300 may handle the addition of four 5-bit operands 201 instead of four 8-bit operands 201 in a first stage 208A. Thus, the intermediate results 203 may include 6 bits, so to generate a final sum 206 with a 6-bit width, soft logic, for example, may truncate a single LSB 204 from each of the intermediate results 203. As such, at each stage (e.g., 208A-208C) of an adder tree (e.g., the second adder tree 300), a different number of LSBs may be truncated, as necessary, to improve packing efficiency. Further, while FIGS. 4 and 5 illustrate the truncation of a single LSB and/or an LSB group 305, which is depicted as a set of three LSBs (e.g., 302-304), any suitable number of LSBs may be truncated from an operand 201 at any suitable stage 208 of an adder tree.

The final sum 206 may suffer errors when compared to actual (e.g., full precision) results of a respective full, non-truncated adder tree. For example, because the truncated LSBs (e.g., 202, 204, and 302-304) are not included in the final sum 206 of the illustrated adder trees (e.g., 210 and 300, respectively), the final sum 206 may differ from the actual results of the respective full adder trees. The final sum 206 may not be significantly different from the actual results of the respective full adder trees, but in some embodiments, more accurate adder tree sums are beneficial.

As such, to improve the accuracy of a final sum 206 while maintaining efficient packing in the integrated circuit 12, an adder tree 200 may be split into multiple trees. Accordingly, FIG. 6. illustrates an embodiment of the second adder tree 300 split into a main tree 308 (e.g., second adder tree 300) corresponding to the summation of the truncated operands 201 and a first trailing adder tree 310A corresponding to the summation of the LSB groups 305 truncated from the operands 201 in the first stage 208A of the main tree 308. As such, the LSB groups 305 may be summed separately from the truncated operands 201. Further, depending on the number of LSBs 302-304 truncated from the operands 201, the first trailing adder tree 310A may or may not implement further truncation. For example, in some embodiments, if the size and/or number of the truncated LSB groups 305 is suitable enough to pack efficiently into the integrated circuit 12, the first trailing adder tree 310A may not implement truncation of the LSB groups 305. In other embodiments, many and/or large LSB groups 305 in the first trailing adder tree 310A may result in truncation of LSBs from the LSB groups 305, themselves.

Figure 6:
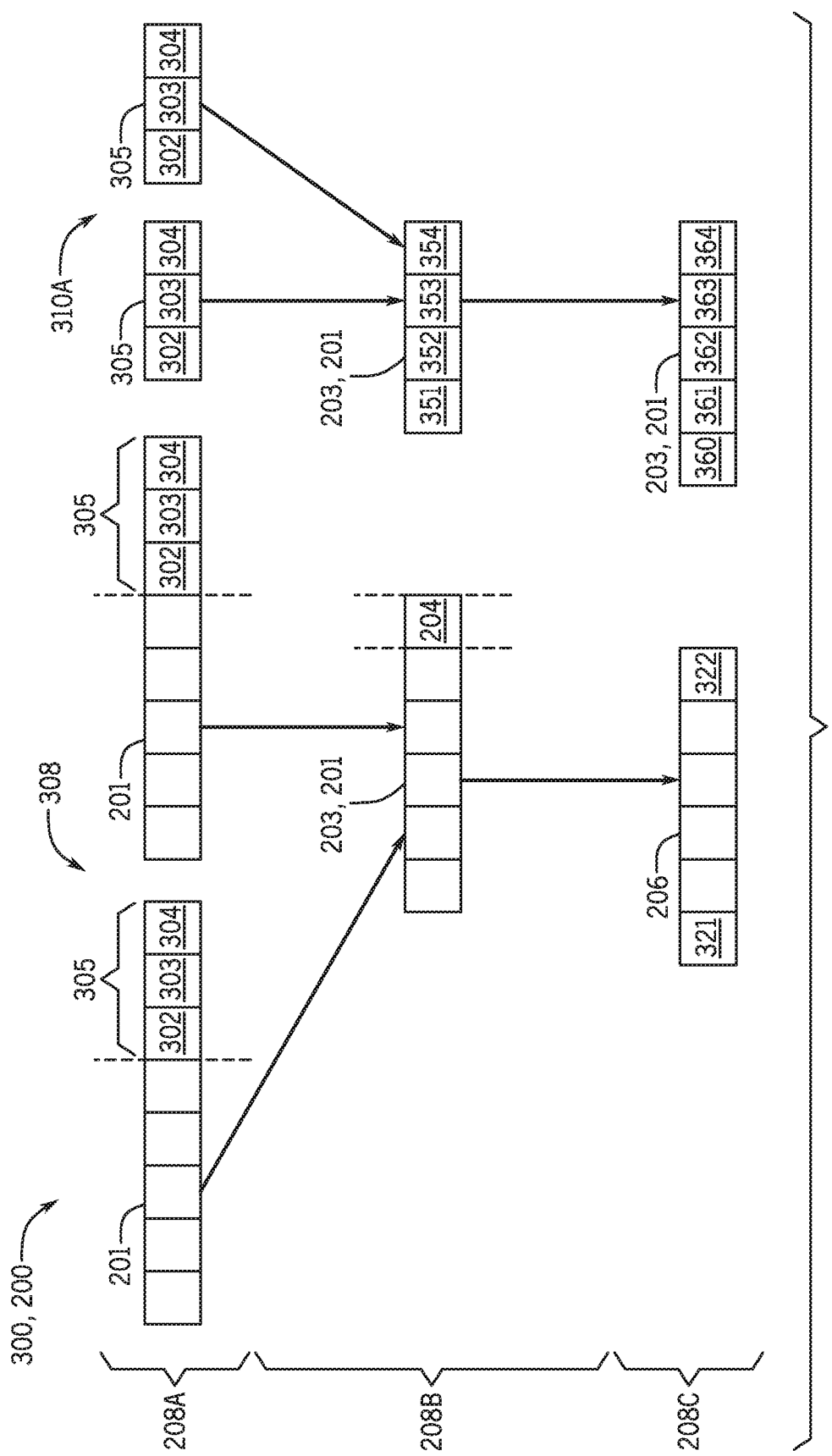
FIG. 6 is a block diagram of the adder tree of FIG. 5 and a trailing adder tree, in accordance with an embodiment.
Figure 7:
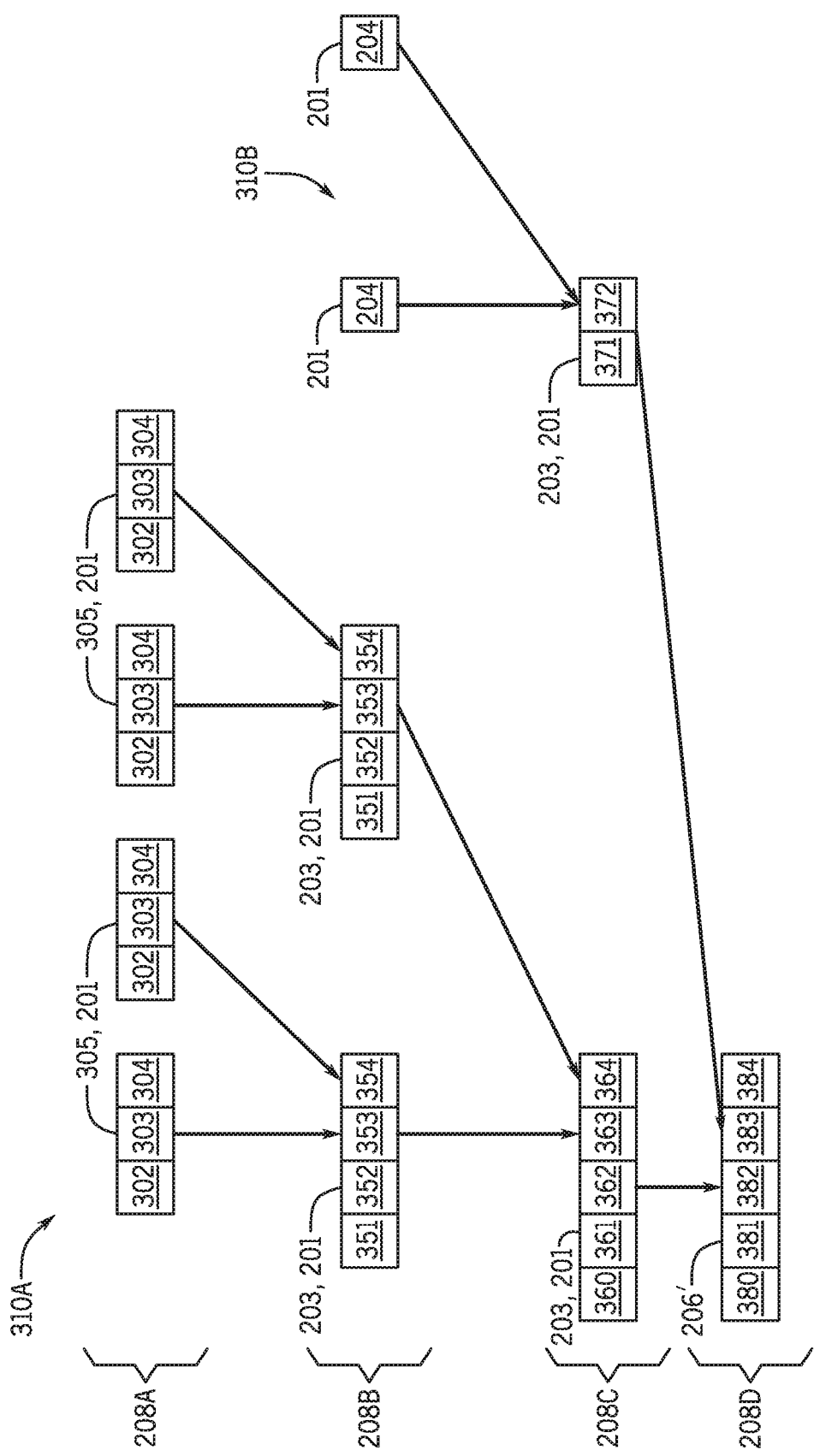
FIG. 7 is a block diagram of a second embodiment of a trailing adder tree.

Further, FIG. 6 may illustrate the use of a first trailing adder tree 310A to sum the LSB groups 305 from the first stage 208A of the main tree 308, but in some embodiments, the main tree 308 may truncate operands 201 at more than one stage. For example, in the illustrated embodiment, soft logic circuitry may truncate the LSB 204 from each of the intermediate results 203 in the main tree 308. As such, in some embodiments, the summation of the LSBs truncated at each stage 208 may be split into a separate tailing tree 310 corresponding to the stage 208. The embodiment in FIG. 7, for example, illustrates the first trailing adder tree 310A that may handle the summation of the LSBs 302-304 from the first stage 208A of the main tree 308 and a second trailing adder tree 310B that may handle the summation of the LSBs 204 from the second stage 208B of the main tree 308. In such embodiments, a summation of the first trailing adder tree 310A and the second trailing adder tree 310B may be aligned. For example, LSB 204 may share the same bit position as bit 351 in the intermediate results 203 in the second stage of the first trailing adder tree 310A. As such, the final sum 206 of the first trailing adder tree 310A may be aligned with the final sum 206 of the second trailing adder tree 310B to sum into a final sum 206' generated by summing the first trailing adder tree 310A and the second trailing adder tree 310B.

Figure 8:
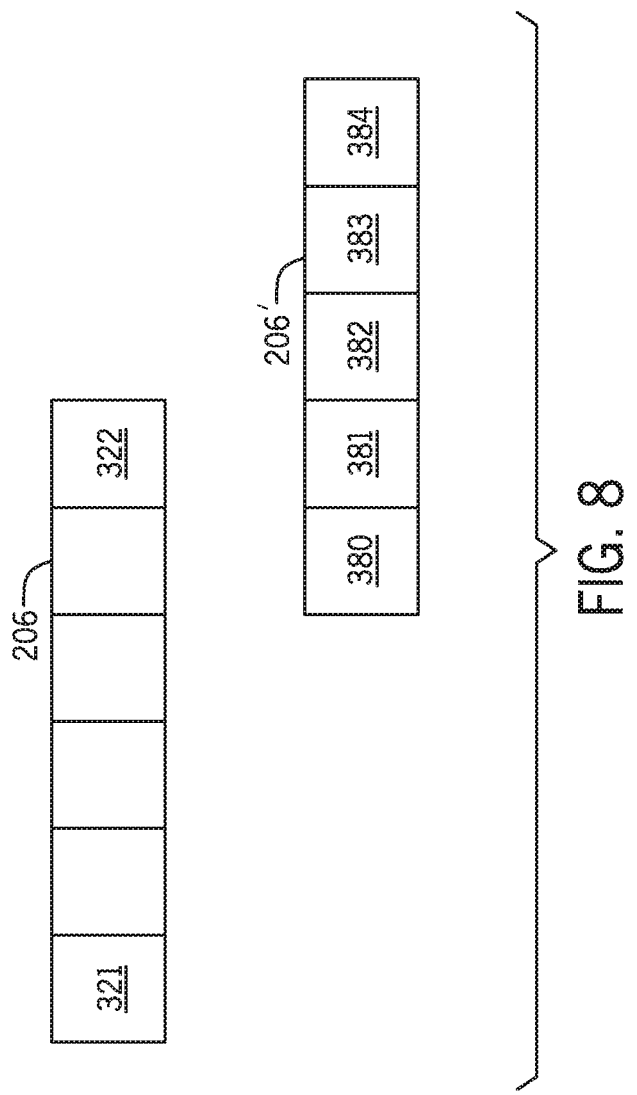
FIG. 8 is a block diagram of a sum of the adder tree of FIG. 5 and a sum of the trailing adder tree of FIG. 7, in accordance with an embodiment.

Accordingly, as illustrated in FIG. 8, the final sum 320 of the main tree 308 may sum together with the final sum 206' of the summed first trailing adder tree 310A and second trailing adder tree 310B. In some embodiments, the MSBs of the final sum 206' may align with the LSBs of the final sum 206. For example, in the illustrated embodiment, bits 323 and 322 of the final sum 206 may align with bits 380 and 381 of the final sum 206', respectively.

While splitting an adder tree 200 (e.g., the second adder tree 300) into separate trees (e.g., 308, 310A, 310B) may appear to pack less efficiently than a single adder tree 200, the truncated main tree 308 may pack to 100% in current FPGAs 40. Further, although the trailing adder tree 310 is not pruned in some cases, there are many possibilities that it may efficiently pack into the FPGA. For example, because a trailing adder tree 310 may use only a small fraction of a soft logic group, multiple nodes of the trailing adder tree 310 may pack into a single logic group. Further, because the trailing adder tree 310 may handle smaller arithmetic operations (e.g., fewer operands, smaller operands, and/or the like) when compared to a main tree 308, the trailing adder tree 310 may pack efficiently into an integrated circuit 12.

In some embodiments, different arithmetic structure may additionally or alternatively be used to construct a trailing adder tree 310. For example, the trailing adder tree 310 may include compressors. Although compressors may utilize more logic per bit, the packing ratio may be very high, as the operation may be structured more like a random logic problem, rather than a restriction of a carry chain mapping of an arithmetic structure.

In some embodiments, building multiple trees may be expensive in terms of resources and area. However, in many cases, the accuracy of the final sum 206 of a summation is more valuable than the accuracy of intermediate results 203. As such, in addition to or in the alternative of handling a contribution of truncated bits by adding the first trailing adder tree 310A into the final sum 206 of the main tree 308, the contribution of the truncated bits may be accounted for with a constant added to the main tree 308. For example, after pruning, or truncating, the operands 201 of the main tree 308, the accuracy of the final sum 206 may be improved by adding a constant or set of constants to the main tree 308 based on an estimate of a value the truncated bits would have contributed to the final sum 206.

Figure 9:
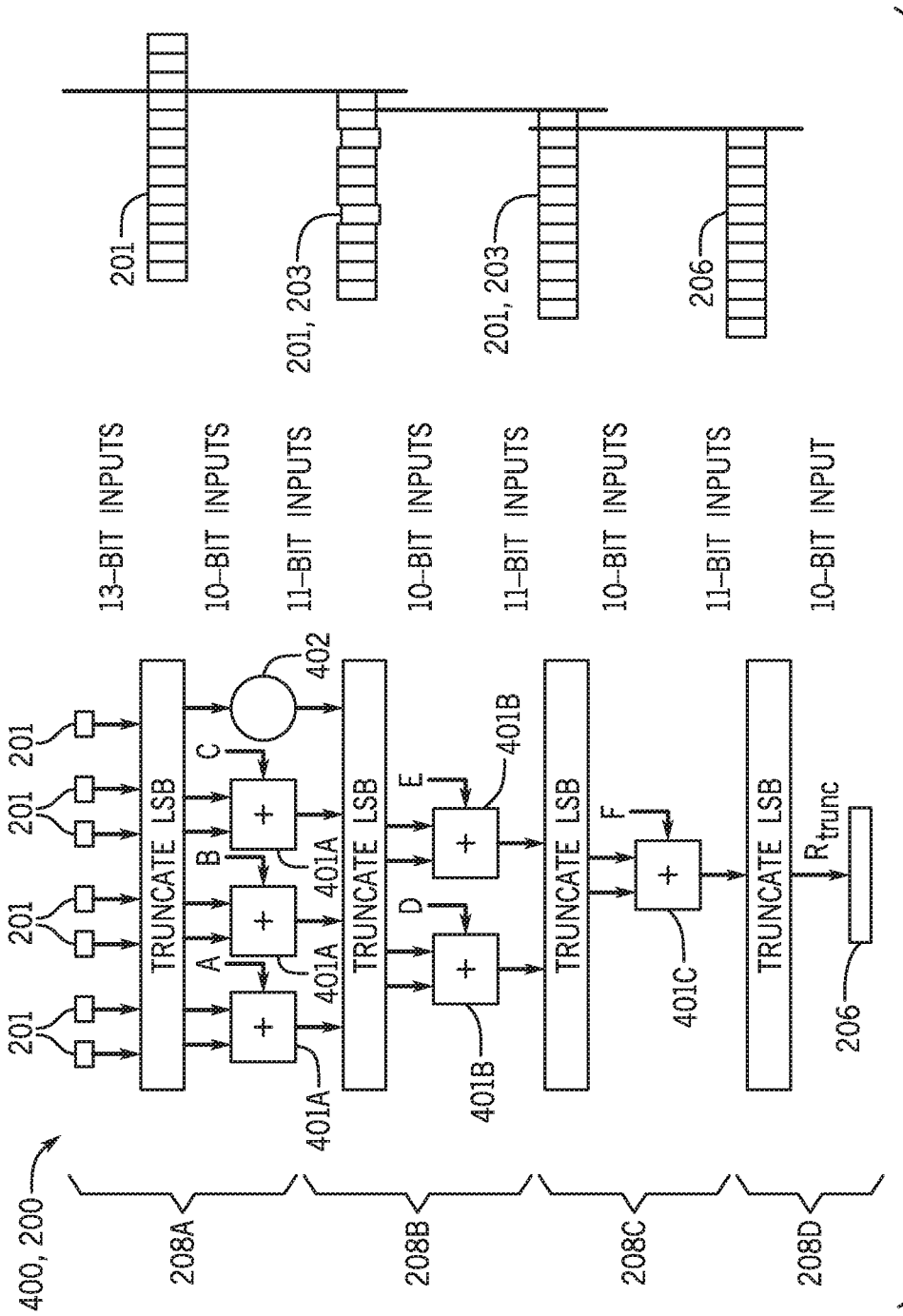
FIG. 9 is a block diagram of a third embodiment of an adder tree.

Accordingly, FIG. 9 illustrates a third adder tree 400 that may include input circuitry configured to receive seven 13-bit operands 201 and may output a single 10-bit final sum 206. In the first stage 208A of the third adder tree 400, each of the 13-bit operands 201 are truncated to 10-bit operands 201. For example, as shown in the right-hand side of FIG. 9, three LSBs are truncated from the operands 201. As discussed, the operands 201 may be truncated in order to pack more efficiently into an integrated circuit 12. The truncated operands 201 are then added together using first adders 401A. Because an odd number of operands 201 are involved in the first stage 208A of the adder tree 200 and because the first adders 401A may receive two operands 201, a no-operation block 402 (no-op) may receive an operand 201 that does not fit in the set of the first adders 401A. Further, after adding the ten-bit operands 201 with the first adders 401A, the intermediate results 203 may include 11-bits, as a result of 1-bit growth.

Thus, in the second stage 208B of the third adder tree 400, an LSB of the 11-bit intermediate results 203 formed by the first adders 401A may be truncated to form three, 10-bit intermediate results 203. The LSB of the operand 201 handled by the no-operation block 402 may also be truncated in order to form a fourth, 10-bit intermediate result 203 and to maintain alignment between the 10-bit intermediate results 203. For example, the operand 201 handled by the no-operation block 402 may be zero padded and/or sign extended before the LSB is truncated in order to create a 10-bit intermediate result 203 that is suitably bit aligned with the other 10-bit intermediate results 203. As such, in the second stage 208B, a set of second adders 401B may sum two sets of two operands from the four 10-bit intermediate results 203. Thus, the second stage 208B may output two, 11-bit intermediate results 203.

The third stage 208C of the third adder tree 400 may receive the two, 11-bit intermediate results 203 and may truncate the LSB of each of the 11-bit intermediate results to form two, 10-bit intermediate results. A third adder 401C may then sum these 10-bit intermediate results to form an 11-bit final sum 206. Accordingly, the fourth stage 208D may truncate an LSB of the 11-bit final sum 206 to form a 10-bit final sum 206. However, as discussed, because bits are truncated from the operands 201 and intermediate results 203 at each stage (208A-208D) of the third adder tree 400, the 10-bit final sum 206 may suffer errors when compared to an actual final result generated by an adder tree 200 without any truncation. As such, in some embodiments, a set of constants (e.g., A-F) may be added to the adder tree at specific stages 208 in order to reduce an average relative error caused by truncating LSBs at any stage 208 of the third adder tree 400.

Figure 10:
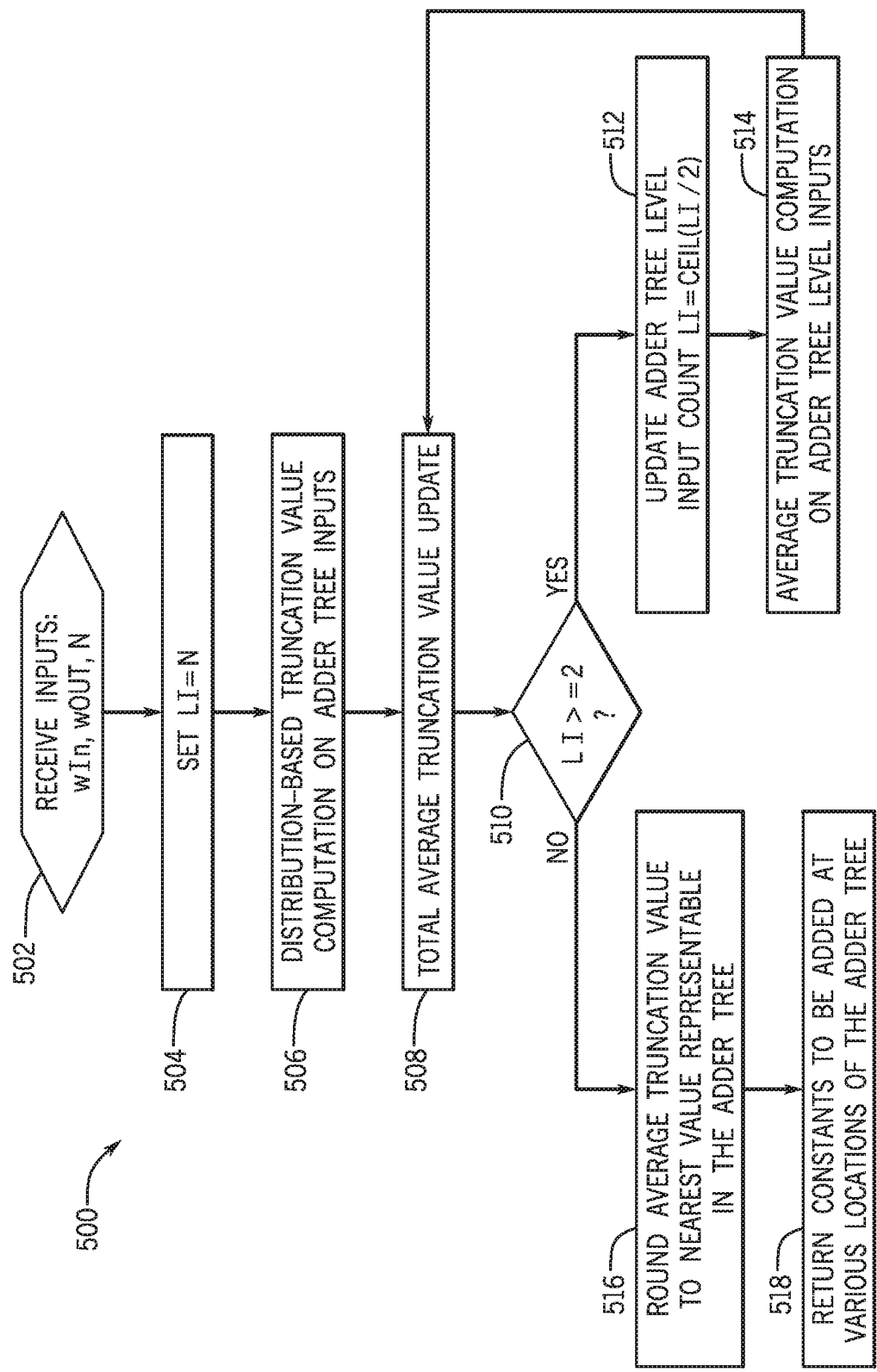
FIG. 10 is a flow chart of a method to determine a total average truncation value involved with truncating operands in the adder tree of FIG. 9, in accordance with an embodiment.

With the foregoing in mind, FIG. 10 illustrates a flow chart of a method 500 for determining a suitable set of constants (e.g., A-F) to add into stages 208 of an adder tree 200, in accordance with embodiments described herein. Although the following description of the method 500 is described in a particular order, which represents a particular embodiment, it should be noted that the method 500 may be performed in any suitable order. Further, certain steps may be skipped altogether, and additional steps may be included in the method 500. Moreover, although the following description of the method 500 is described as being performed by the processor 101, which may include one or more processing systems, it should be noted that the method 500 may be performed by any suitable computing device.

At block 502, the processor 101 may receive and/or determine a number of inputs, as represented by wIn, wOut, and N in the illustrated embodiment. As such, the processor 101 may receive a width of input data (wIn) (e.g., a width of operands 201), a width of output data (wOut) (e.g., a width of final sum 206), and a number of operands 201 to be summed together (N) in the adder tree 200. For example, with reference to the third adder tree 400 of FIG. 9, the processor 101 may receive wIn=13 (e.g., 13-bit operands 201), wOut=10 (e.g., 10-bit final sum 206), and N=7 (e.g., 7 input operands 201) as inputs.

The processor 101 may then, at block 504, set the number of level inputs (LI), or the number of operands to be summed at a particular stage 208 of the adder tree 200, to N, as the first stage 208A of the adder tree 200 may receive all of the operands 201. Accordingly, for the third adder tree 400 of FIG. 9, the processor 101 may set LI=7.

At block 506, the processor 101 may determine a truncation value, or an average error introduced by truncation, at the first stage 208A of the adder tree 200 based on a distribution of the adder tree 200 operands 201 (e.g., inputs). In some embodiments, the processor 101 may determine the truncation value at the first level of the adder tree 200 based on an assumption that the values of the operands 201 are uniformly distributed. For example, with reference to FIG. 9, the LSB groups 305 truncated at the first stage 208A may range in value from 0 (e.g., 000) to 7 (e.g., 111). With a uniform distribution of the operands 201, the truncation value introduced by removing the LSB groups 305 from an operand 201, is 3.5. Thus, the sum of the truncation values for each of the seven 13-bit operands 201 truncated to 10-bit operands 201, is 24.5.

At block 508, the processor 101 may then update a total average truncation value for the adder tree 200. As the total average truncation value may be initiated to 0, after block 506 is completed, the total average truncation value may be updated to match the value computed at block 506.

The processor 101 may then, at block 510, determine whether LI is greater than or equal to 2. As such, the processor may determine whether it is handling calculations for a final stage 208 of the adder tree 200 or an earlier stage 208 of the tree. If LI is greater than or equal to 2, the processor may, at block 512, update LI to LI=ceil(LI/2). As such, the processor may round the operation LI/2 to its ceiling. For example, the third adder tree 400 of FIG. 9 receives seven 13-bit operands 201 at its first stage 208A. As such, the starting value of LI=7, which is greater than 2. Thus, at block 512 the processor 101 may update according to ceil(7/2), resulting in LI=4, which corresponds to the number of 11-bit intermediate results 203 received by the second stage 208B of the adder tree. In a next iteration, the processor 101 may update the value of LI to 2, corresponding to the number of 11-bit intermediate results 203 received by the third stage 208C, and in a final iteration, or at the final stage 208D the value of LI will be 1, corresponding to the final sum 206.

At block 514, the processor 101 may compute the average truncation value for the level inputs of a next stage 208 based on an average truncation value. To do so, the processor 101 may update the stage 208 of the adder tree 200 examined after updating the value of LI, and similar to block 508, may determine the average truncation value resulting from truncating intermediate results 203 at the examined stage 208. Though, while the processor 101 may utilize distribution-based data (e.g., the assumption that the operands are uniformly distributed) to determine the truncation value at block 506, the processor may determine the truncation value based on an average at block 508. For example, the processor 101 may calculate the truncation value of the first stage 208A of the third adder tree 400 at block 506 and may subsequently determine a truncation value of the second stage 208B when LI=4, of the third stage 208C when LI=2, and of the fourth stage 208D when LI=1 at block 512. Because the processor 101 may determine the truncation value based on an average truncation value for each intermediate result 203 of the adder tree 200, in the second stage 208B, truncating a single bit with the maximum value of 8 (e.g., $2^3$) will have an average value of 4. As such, across four 11-bit intermediate results 203, the processor 101 may determine an average truncation value of 16 for the second stage 208B. The maximum value of the truncated LSB is 8 because although it is a single bit, when compared to the original 13-bit operand 201, the LSB truncated from the 11-bit intermediate result 203 in the second stage 208B is the fourth bit. Further, for the third stage 208C, the processor 101 may compute an average truncation value of 8 and a total truncation value of 16 across the two 11-bit intermediate results 201, as the maximum value of the truncated LSB, which is in the fifth bit position relative to the 13-bit operand 201, is 16. For the fourth stage, the processor 101 may compute an average truncation value and a total truncation value of 16, as there is a single LSB truncated from the sixth bit position relative to the 13-bit operand 201 from the 11-bit final sum 206.

Accordingly, as the method 500 loops back, the processor may, at block 508, add a most recently calculated truncation value to the total average truncation value to account for the truncation value of each stage 208 of the adder tree 200. As such, for the third adder tree 400, the processor 101 may iteratively add 24.5 to the average truncation value for the first stage 208A, 16 for the second stage 208B, 16 for the third stage 208C, and 16 for the fourth stage 208D each time it reaches block 508 for a total average truncation value of 72.5.

After the processor 101 determines, at block 510, that LI is less than 2, the processor 101 may, at block 516, round the average truncation value to a nearest value representable in the adder tree, which may be determined based on the location of the constants (e.g., A-F). In FIG. 9, for example, because the constants A-C each represent a single bit carried into each of the first adders 401A and because, with respect to the 13-bit operands 201, the constants A-C are carried into the fourth bit position, they may each represent an 8 or a 0. Similarly, the constants D-E, which are carried into the set of second adders 401B at the fifth bit position, may represent a 16 or a 0, and the constant F, which is carried into the third adder 401C at the sixth bit position, may represent a 32 or a 0. As such, $A*8+B*8+C*8+D*16+E*16+F*32$, where A-F are integer values is a representative equation of a value representable in the adder tree 200. Thus, a total average truncation value of 72.5, may be approximated by 72 in the adder tree 200 by setting A=1, F=2, and all other constants to 0, among other combinations of the constants.

After determining a value for the average truncation value that is representable in the adder tree 200, for example, after determining a suitable combination of constants that most closely match the average truncation value, the processor 101 may return the constants to be added to the appropriate stages of the adder tree 200. Accordingly, the constants may be integrated in the design of the adder tree 200 as it is generated in an integrated circuit 12.

While the method 500 is described with reference to the third adder tree 400 of FIG. 9, it should be appreciated that the method may be applied to any suitable adder tree with any suitable values for wIn, wOut, and N.

Figure 11:
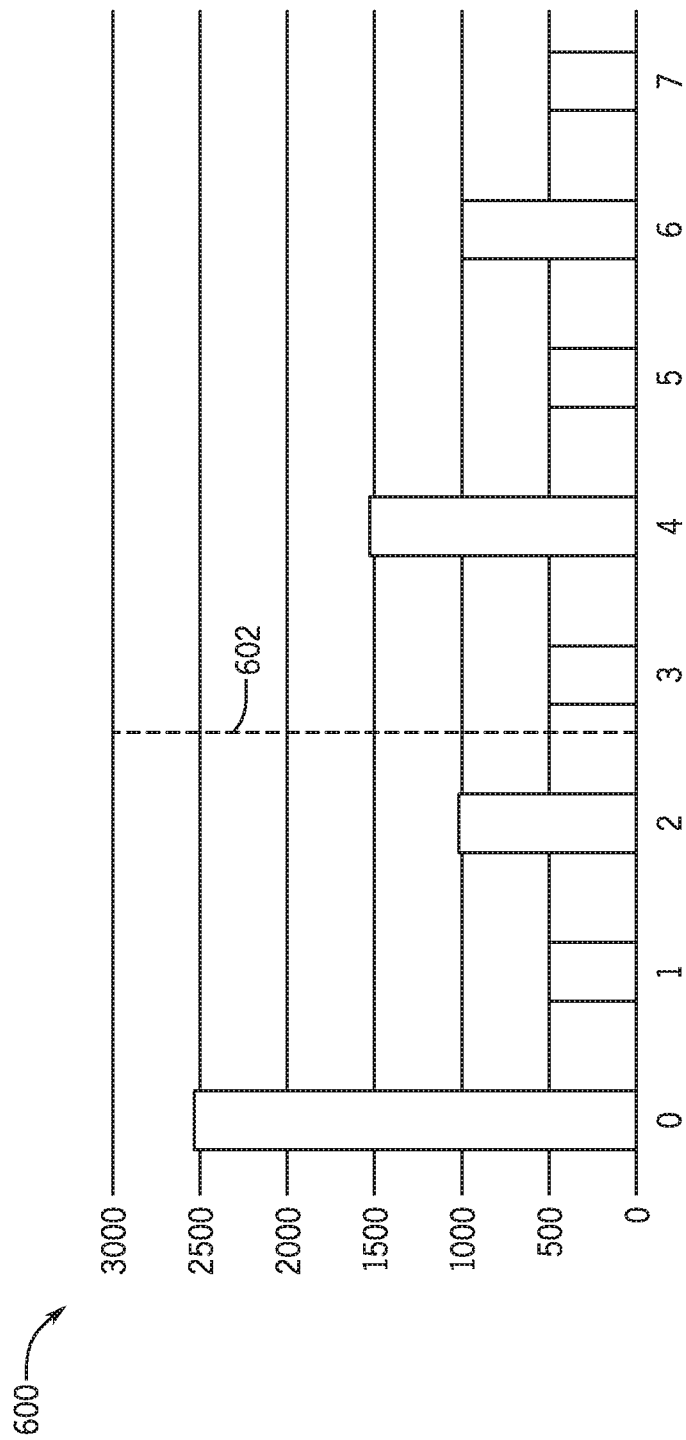
FIG. 11 is a chart of a static distribution of the bits truncated from the operands in the adder tree of FIG. 9, in accordance with an embodiment.

Further, in the embodiment described above, at block 506, the processor 101 may determine the truncation value at the first level of the adder tree 200 based on an assumption that the values of the operands 201 are uniformly distributed. Additionally or in the alternative, the processor 101 may utilize data regarding the operands 201 and/or determine that the values of the operands 201 are not uniformly distributed. For example, with reference to FIG. 11, given an 8-bit by 5-bit unsigned multiplier, a chart 600 may capture distribution of the 3 LSBs in the resulting 13-bit product, which may be input as a 13-bit operand 201 to the adder tree 200. For example, the chart 600 may illustrate the distribution of each of the possible values, which may discretely range from 0 to 7, of the 3 LSBs in a product that may result from each of the possible inputs to the multiplier. As illustrated, the value of the 3 LSBs is most likely to be 0 for any given input to the multiplier. Accordingly, a weighted average of the value of the 3 LSBs may land at 2.375, as denoted by the line 602, instead of at the unweighted average of 3.5. To that end, if, at block 506, the processor 101 determines, for example, that the operands 201 result from an 8-bit by 5-bit unsigned multiplier, the processor 101 may use the distribution information provided in chart 600 to determine that a truncation value for each of the 7 operands 201 is 2.375 and that the total for the operands 201 is 16.625. In such embodiments, the total average truncation value for the adder tree 200 determined by the processor may have improved accuracy, which may result in a set of constants that more accurately correct for the truncation errors.

Figure 12:
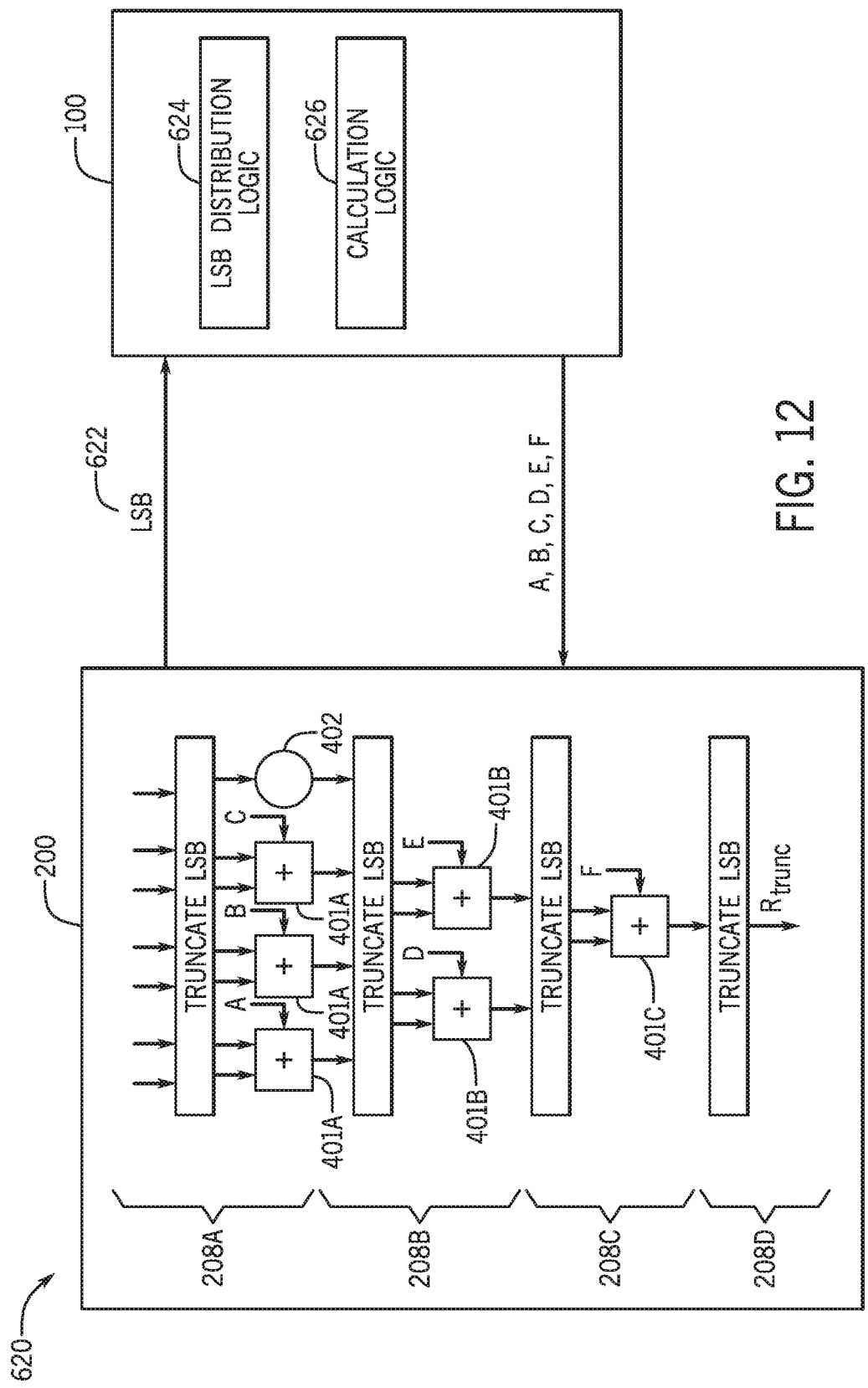
FIG. 12 is a block diagram of a system, in which a dynamic distribution of the bits truncated from the operands of in the adder tree of FIG. 9 and a total average truncation value are determined, in accordance with an embodiment.

Further, in some embodiments, the set of constants may update dynamically based on a current distribution of the LSBs of the operands. For example, as discussed with reference to FIGS. 9 and 10, while the processor 101 may determine the set of constants that may reduce truncation error in an adder tree 200 prior to the construction of the adder tree 200, in some embodiments, the data processing system 100 and/or the processor 101 may periodically update the values of the set of constants after the construction of the adder tree 200. Accordingly, FIG. 12 illustrates an embodiment of an adder tree system 620 that may modify the values of a set of constants (e.g., A-F) added into the adder tree 200.

In such embodiments, a register and/or location in memory 102 may map to each of the set of constants (e.g., A-F) so that during the adder tree's 200 execution of an arithmetic operation, the values of each of the set of constants (e.g., A-F) may be retrieved and fed into the adder tree 200. Further, as illustrated, a processing system, such as data processing system 100 may receive data regarding LSBs 622 from the adder tree 200. The data regarding the LSBs 622 may include information such as the value of the LSBs, as well as the stage 208 of the adder tree 200 that the LSBs are received from. For example, the data processing system 100 may receive data regarding the LSBs 622 for LSBs at any stage 208 within the adder tree 200. Further, the data processing system 100 may include LSB Distribution Logic 624. A suitable combination of components (e.g., the processor 101 and the memory 102) of the data processing system 100 may implement and/or contribute to the LSB Distribution Logic 624. In any case, the LSB Distribution Logic 624 may receive the data regarding the LSBs 622 and may determine and/or update a distribution of LSBs for any suitable stage 208 (e.g., a stage 208 from which data regarding the LSBs 622 was received). As such, the data processing system 100 may maintain one or more sets of LSB distributions, as illustrated in FIG. 11.

Calculation logic 626 may utilize the one or more sets of LSB distributions maintained by the LSB Distribution Logic 624 to determine a suitable set of constants (e.g., A-F) to feed into the adder tree 200 to reduce truncation error. To determine the suitable set of constants (e.g., A-F), as discussed above, the calculation logic 626 may sum the truncation error values for each stage 208 of the adder tree 200 and may determine the closest value of the total truncation error representable by the constants fed into the adder tree 200 based on the location (e.g., stage 208) the constants are fed into (e.g., based on an equation, such as $A*8+B*8+C*8+D*16+E*16+F*32$). After the calculation logic 626 determines the suitable set of constants, the data processing system 100 may transmit the suitable set of constants to their respective registers to update a current value associated with each constant stored in a respective register. Accordingly, an updated values for the set of constants may feed into the adder tree 200 via the respective set of registers.

In some embodiments, in addition to or in the alternative of following method 500 to calculate a set of constants suitable to offset truncation error, a set of pre-calculated fixed adjustment values can be used, without analyzing weights or applications. In one case, for example, these values might be fixed to twice the number of input values in the tree. In another case, heuristics may be used to determine a most likely adjustment value.

In any case, a constant number may be added to the adder tree 200, which may be accomplished in a number of suitable ways. A simple method may involve adding the constant number directly to an output of the adder tree 200. For example, the adder tree 200 may compute and round its intermediate results 203 and final sum 206 without any modification to the tree, and after the final sum 206 is produced, the constant number may be added to the final sum 206. As such, however, this method may add one cycle of latency and additional soft logic adder resources. If, however, there is an unpaired tuple in the adder tree 200, the constant may add into the unpaired tuple with lower latency than adding the constant to the final sum 206 of the adder tree 200. Further, in some embodiments, by using soft logic associated with embedded ripple carry adders of modern FPGAs 40 to add the constant, no additional latency or area may be utilized to correct the truncation error.

Figure 13:
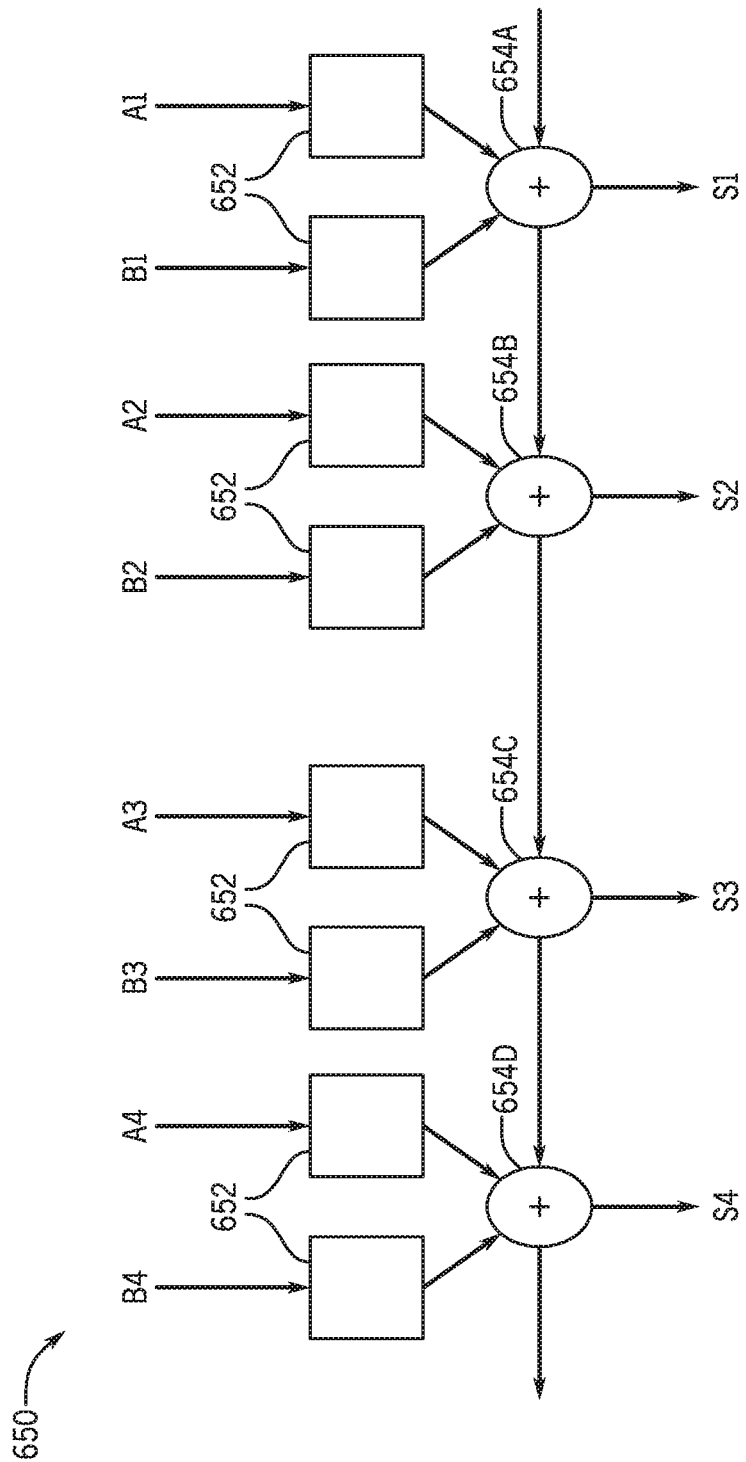
FIG. 13 is a block diagram of an adder tree node, in accordance with an embodiment.

Accordingly, FIG. 13 illustrates an embodiment of an adder tree node 207 mapped to a 2-input adder 650. The 2-input adder 650 may receive a first 4-bit operand A (e.g., A1-A4) and a second 4-bit operand B (e.g., B1-B4) and may output a 4-bit result S (e.g., S1-S4). To produce the 4-bit result S, the 2-input adder 650 may contain a ripple carry adder 654 for each bit in the first 4-bit operand A and/or the second 4-bit operand B. For example, the first bit of the first 4-bit operand A (A1) and the first bit of the second 4-bit operand B (B1) may map to a first ripple carry adder 654A, the second bit of the first 4-bit operand A (A2) and the second bit of the second 4-bit operand B (B2) may map to a second ripple carry adder 654B, the third bit of the first 4-bit operand A (A3) and the third bit of the second 4-bit operand B (B3) may map to a third ripple carry adder 654C, and the fourth bit of the first 4-bit operand A (A4) and the fourth bit of the second 4-bit operand B (B4) may map to a fourth ripple carry adder 654D. As such, each ripple carry adder 654 may output a single bit (e.g., S1-S4) to form the 4-bit result S and may pass a carry bit, which may add into a sum calculated by an ripple carry adder 654, to the next ripple carry adder 654. In some embodiments, although there is no ripple carry adder 654 preceding the operation of the first ripple carry adder 654A, the first ripple carry adder 654A may receive a carry bit, which may impact the resulting sum in the 4-bit result S.

Further, each operand bit (e.g., A1-A4, and/or B1-B4) may not map directly to a respective adder (e.g., 654A-654D); instead, a set of soft logic blocks 652 associated with the adders 654 may process the operand bits and may output a result to the adders 654. In the illustrated embodiment, for example, a soft logic block 652 receives the first bit of the first 4-bit operand A (A1) and outputs a result based on the first bit of the first 4-bit operand A (A1) to the first ripple carry adder 654A, and a soft logic block 652 receives the first bit of the second 4-bit operand B (B1) and outputs a result based on the first bit of the second 4-bit operand B (B1). In some embodiments, the operand bits (e.g., A1-A4, and/or B1-B4) may pass through the soft logic blocks 652 without any modification before reaching the adders 654. For example, the 2-input adder 650 may operate as though the soft logic blocks 652 are not included between the operand bits (e.g., A1-A4, and/or B1-B4) and the adders 654, or as though the operand bits (e.g., A1-A4, and/or B1-B4) are coupled directly to the adders 654. In some embodiments, however, the soft logic blocks may impact the 4-bit result S of the 2-input adder 650.

Figure 14:
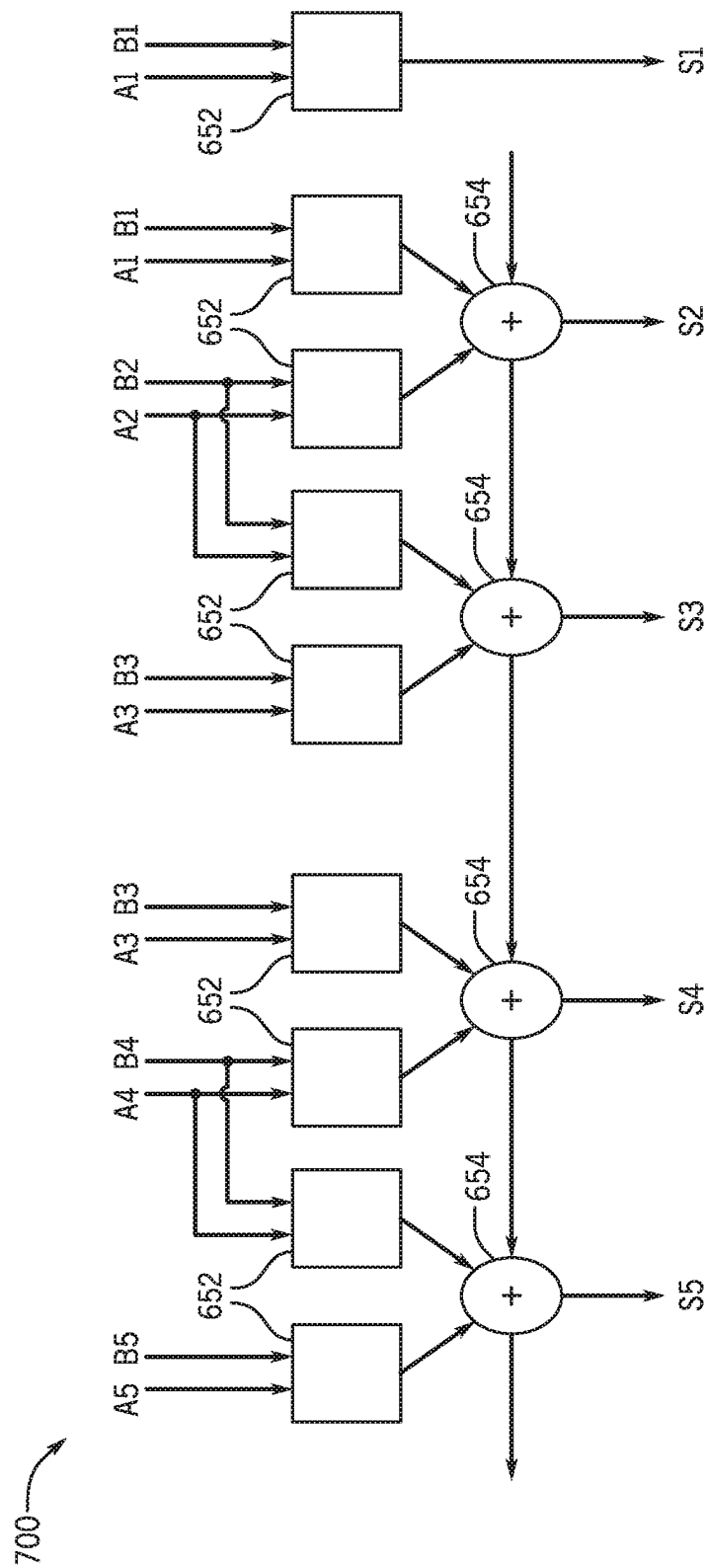
FIG. 14 is a block diagram of an adder tree node, in which a compressor structure is implemented, in accordance with an embodiment.

Turning to FIG. 14, the soft logic blocks 652 may emulate a constant (e.g., constant compression) for a 3-2 compressor structure 700. In such embodiments, additional connections between the soft logic blocks 652 and the adders 654 may be available to implement 3-input adders by first generating a 3-2 compression. Accordingly, two operands, A and B, may route to multiple soft logic blocks 652 simultaneously. As an integrated circuit 12 may contain many redundant connections available, this routing may not stress local routing significantly. The soft logic blocks 652 may directly encode a third operand, which may be a constant. As such, a constant (e.g., the third operand) may be added anywhere in the tree without additional logic, routing, or latency impact.

Returning to FIG. 13, in some embodiments, the soft logic blocks 652 may contain a LUT. As such, the sum bits (e.g., S1-S4) and the carry bits produced by a respective ripple carry adder 654 may be determined based on mappings in the LUT of the soft logic blocks 652. Further, in some embodiments, soft logic blocks 652 may determine the carry bit received by the first ripple carry adder 654A based in part on LUTs. In such embodiments, the soft logic blocks 652 may account for rounding error involved with truncating an LSB. For example, the soft logic blocks 652 may determine a carry bit that the LSB would have contributed to the 4-bit result S if it had not been truncated and may add the carry bit into the first ripple carry adder 654A to reduce rounding errors caused without the contribution of the carry bit. To do so, a bit truncated from the first operand A (A0) and a sign bit from the first operand A (SA) may feed into a first soft logic block 652. The first soft logic block 652 may contain a LUT mapping the inputs A0 and SA to an output (A0 XOR SA), or the exclusive or of A0 and SA. Further, a truncated bit from the second operand B (B0) and a sign bit from the second operand B (B0) may feed into a second soft logic block 652. The second soft logic block may contain a LUT mapping the inputs B0 and SB to an output (B0 XOR SB), or the exclusive or of B0 and SB. The outputs of the first soft logic block 652 and the second soft logic block 652 may feed into a ripple carry adder 654. In some embodiments, the ripple carry adder 654 may also receive SA as a carry bit. As such, the ripple carry adder 654 may generate a sum bit and a carry out bit based on the addition of (A0 XOR SA), (B0 XOR SB), and SA (e.g., (A0 XOR SA)+(B0 XOR SB)+SA). Accordingly, Table 1 demonstrates the possible combinations of SA, SB, A0, and B0 and the sum and carry that result from each combination.

TABLE 1

| (A0 XOR SA) + (B0 XOR SB) + SA | | | | | |
|---|---|---|---|---|---|
| Sign A | Sign B | A0 | B0 | Sum | Carry |
| 0 | 0 | 0 | 0 | 0 | 0 |
| 0 | 0 | 0 | 1 | 1 | 0 |
| 0 | 0 | 1 | 0 | 1 | 0 |
| 0 | 0 | 1 | 1 | 0 | 1 |
| 0 | 1 | 0 | 0 | 1 | 0 |
| 0 | 1 | 0 | 1 | 0 | 0 |
| 0 | 1 | 1 | 0 | 0 | 1 |
| 0 | 1 | 1 | 1 | 1 | 0 |
| 1 | 0 | 0 | 0 | 0 | 1 |
| 1 | 0 | 0 | 1 | 1 | 1 |
| 1 | 0 | 1 | 0 | 1 | 0 |
| 1 | 0 | 1 | 1 | 0 | 1 |
| 1 | 1 | 0 | 0 | 1 | 1 |
| 1 | 1 | 0 | 1 | 0 | 1 |
| 1 | 1 | 1 | 0 | 0 | 1 |
| 1 | 1 | 1 | 1 | 1 | 0 |

Further, as discussed, by utilizing the LUTs, the soft logic blocks 652 may determine a carry bit that the addition of A0 and B0 would have contributed to the summation of the first 4-bit operand A and the second 4-bit operand B, had they not been truncated. However, for a two's complement operand, both SA and SB may add to (A0 XOR SA)+(B0 XOR SB) in order to generate the suitable carry bit. Thus, as the carry bit generated according to Table 1 (e.g., according to the result of the ripple carry adder 654) is missing the contribution of SB because, for example, the ripple carry adder 654 may only receive a single carry in bit, the carry bit may feed into the first ripple carry adder 654A of the 2-input adder 650 and the SB may add into any suitable portion of the 2-input adder 650 and/or a later portion of an adder tree 200 at a suitable bit position.

Further, in some embodiments, because of the location of the ripple carry adder 654, the SA bit may not be able to feed into the ripple carry adder 654. For example, the ripple carry adder 654 may not receive a carry in bit. In such embodiments, the output of the adder may represent the summation of (A0 XOR SA)+(B0 XOR SB) without the contribution of SA. As such, Table 2 demonstrates the results of the above summation without the contribution of SA for each combination of SA, SB, A0, and B0.

TABLE 2

| (A0 XOR SA) + (B0 XOR SB) | | | | | |
|---|---|---|---|---|---|
| Sign A | Sign B | A0 | B0 | Sum | Carry |
| 0 | 0 | 0 | 0 | 0 | 0 |
| 0 | 0 | 0 | 1 | 1 | 0 |
| 0 | 0 | 1 | 0 | 1 | 0 |
| 0 | 0 | 1 | 1 | 0 | 1 |
| 0 | 1 | 0 | 0 | 1 | 0 |
| 0 | 1 | 0 | 1 | 0 | 0 |
| 0 | 1 | 1 | 0 | 0 | 1 |
| 0 | 1 | 1 | 1 | 1 | 0 |
| 1 | 0 | 0 | 0 | 1 | 0* |
| 1 | 0 | 0 | 1 | 0 | 1 |
| 1 | 0 | 1 | 0 | 0 | 0 |
| 1 | 0 | 1 | 1 | 1 | 0* |
| 1 | 1 | 0 | 0 | 0 | 1 |
| 1 | 1 | 0 | 1 | 1 | 0* |
| 1 | 1 | 1 | 0 | 1 | 0* |
| 1 | 1 | 1 | 1 | 0 | 0 |

The bits marked with an asterisk (*) in the "Carry" column may represent carry bit errors due to the absence of the SA carry into the ripple carry adder 654. For example, in comparison with Table 1, the asterisked carries of Table 2 are incorrect for the same combinations of SA, SB, A0, and B0 (e.g., {SA, SB, S0, A0}={1, 0, 0, 0}, {1, 0, 1, 1}, {1, 1, 0, 1}, {1, 1, 1, 0}). As such, to account for the missing SA carry in, the LUTs and/or the soft logic blocks 652 may contain additional logic to force a carry out value of 1 for the asterisked combinations of SA, SB, A0, and B0.

In some embodiments, packing may be improved by removing a LSB from a level in a multiplier. A multiplier may compute a product by generating a set of partial products, each at a different level, before adding them all together. For example, in a first level of a multiplier, a partial product may be generated by multiplying (e.g., logical AND) a first bit of a multiplier in a multiplication operation by each bit of a multiplicand in the multiplication operation. In a second stage, a partial product may be generated by multiplying second bit of the multiplier with each bit of the multiplicand. As such, removing an LSB from a level in a multiplier may involve removing an LSB from a multiplier and a multiplicand involved in a multiplication operation. Assuming the multiplication operation is a signed magnitude operation (e.g., the multiplier and the multiplicand are both in signed magnitude format), to account for an error involved with truncating (e.g., removing) the LSB from the multiplier and the multiplicand, the carry that the multiplier and the multiplicand would have had at the level the LSBs were removed may be calculated. To do so, the LSB of the output (e.g., partial product) of the multiplier at both the multiplier level the LSBs are removed from, as well as the following multiplier level, may be determined. For example, for a multiplier A with an LSB A0 truncated at a first multiplier level and a multiplicand B with an LSB B0 truncated at the first multiplier level, the first multiplier level output LSB (e.g., A0 AND B0) may be determined and the second multiplier level output LSB involving the second multiplier bit A1 and the second multiplicand bit B1 (e.g., A1 AND B1) may be determined. The contribution of the LSBs A0 and B0 may then be determined by taking the exclusive or (XOR) of the first multiplier level output LSB and a sign bit of the first multiplier level output (Sign1) (e.g., (A0 AND B0) XOR Sign1), by taking the XOR of the second multiplier level output LSB and a sign bit of the second multiplier level output (Sign2) (e.g., (A1 AND B1) XOR Sign2), and by adding the results of these two operations (e.g., ((A0 AND B0) XOR Sign1)+((A1 AND B1) XOR Sign2)). To do so, logic for the operations discussed above may be included in at least a portion of one or more ALMs. In some embodiments, the logic to compute ((A1 AND B1) XOR Sign2) may be included in a MSB half, or portion, of an ALM, as the A1 and B1 bits are in a more significant bit position than the A0 and B0 bits. The LSB half of the ALM may include logic to compute ((A0 AND B0) XOR Sign1)+(A0 AND B0) XOR Sign1)), the result of which may force a carry into the MSB so that the contribution of A0 and B0 is applied to A1 and B1 even though A0 and B0 are truncated. In such embodiments, the multiplier may pack more efficiently into an integrated circuit 12 and the final product computed by the multiplier may remain unchanged, as the contribution of the truncated bits (e.g., A0 and B0) is taken into account.

Further, in some embodiments, packing may be improved by removing an MSB from the result of the first stage 208A of an adder tree 200. More specifically, in embodiments involving the addition of two or more signed magnitude operands 201 in the first stage 208A, a sign bit (e.g., MSB) of one or more of the results of the addition may be truncated. In such embodiments, a suitable sign bit may be included later, such as added to the final sum 206 of the adder tree 200. For example, when adding a first operand 201A having seven bits in signed magnitude with a second operand 201B having six bits in signed magnitude, the result of the addition would include seven data bits and an eighth bit handling a sign extension. As such, the MSB of the result is the sign bit. However, because when the sign of the first operand 201A and the sign of the second operand 201B are both 0 (e.g., the first operand 201A and the second operand 201B are positive), the sign bit of the result will also be 0. When the sign of the first operand 201A and the sign of the second operand 201B are both 1 (e.g., the first operand 201A and the second operand 201B are negative), the sign bit of the result will also be 1, and when the sign of the first operand 201A does not match the sign of the second operand 201B, the sign bit of the result will match the sign of the first operand 201A (e.g., the MSB of the first operand 201A). Accordingly, the MSB of the result may be encoded based on the sign bits of the first operand 201A and the second operand 201B. As such, the MSB of the result may be truncated and later decoded to add back into an intermediate result 203 or final sum 206 of the adder tree 200. To that end, because the MSB is not included in the result, resources involved with maintaining the MSB at each stage 208 of the adder tree are removed (e.g., decoupled) from the adder tree, which may result in more efficient packing of the adder tree.

Figure 15:
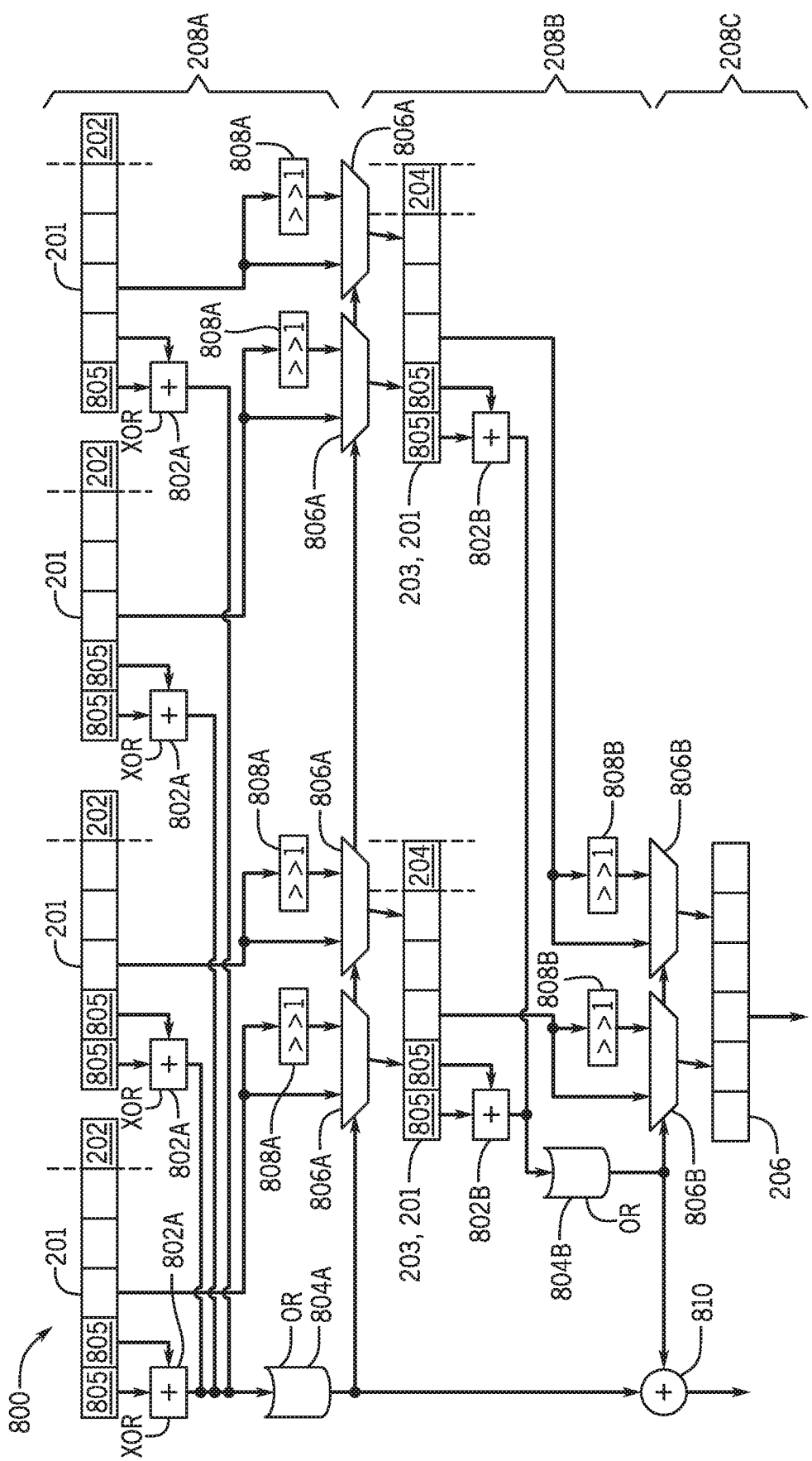
FIG. 15 is a block diagram of block floating point tree, in accordance with an embodiment.

Turning now to FIG. 15, a block floating point tree 800 illustrates a method of using soft logic in pruned adder trees 200 (e.g., adder trees 200 with truncated operands 201) to increase accuracy of the final sum 206. The block floating point tree 800 may include a set of XOR gates 802. Each XOR gate 802 may be configured to receive two MSBs 805 from the operands 201 input to the block floating point tree 800. At each XOR gate 802, the two MSBs 805 of each operand 201 are checked to predict a possible overflow in a following stage 208 of the block floating point tree 800. As such, the XOR gates 802 are used to check a dynamic range of the operands 201 in the first stage 208A. An OR gate 804 then logical ORs results from the XOR gates 802 together, to generate a single determination factor for the entire first stage 208A. The determination factor may feed into a set of multiplexers 806 (muxes) as a select signal used to select between the operands 201 or the operands 201 right shifted by a bit (e.g., with the LSB 202 truncated), which are fed into the muxes 806 via shift blocks 808. For example, when an XOR gate 802 coupled to any of the operands 201 in the first stage 208A predicts a possible overflow due to the respective operand 201, the OR gate 804 may select the operands 201 right shifted by a bit from each of the muxes 806 to account for bit growth. On the other hand, when none of the XOR gates 802 predict a possible overflow due to any of the operands 201, the OR gate 804 may select the unchanged operands 201 from each mux 806. In any case, the outputs of the muxes 806 may add together in two sets of two to produce intermediate results 203.

Similar to the first stage 208A of the block floating point tree 800, in the second stage 208B of the block floating point tree 800, the two MSBs 805 of the intermediate results 203 may feed into a second set of XOR gates 802B. The second set of XOR gates 802B may predict possible overflow of the intermediate results 203 and may couple to a second OR gate 804B so that the second OR gate 804B may select between the intermediate results 203 and the intermediate results 203 right shifted by a bit via shift blocks 808B based on overflow predictions for the intermediate results 203. The second OR gate 804B may select the intermediate results 203 when no carry is predicted for any of the intermediate results 203 and may select the intermediate results 203 right shifted by a bit when at least one intermediate result 203 is predicted to overflow.

In the third stage 208C of the block floating point tree 800, the outputs selected from the second set of muxes 806B are added together to generate the final sum 206 with a suitable number of bits. Further, the outputs of the OR gate 804A and the second OR gate 804B are summed by an adder structure 810 (e.g., an adder tree 200) to create a common block floating point exponent (e.g., normalization factor) for the block floating point tree 800; though, the adder structure 810 may sum the OR gate (e.g., 804A-804B) outputs at any suitable location in the block floating point tree 800 and is not limited to summing the outputs in the third stage 208C. In some embodiments, the adder structure 810 may handle any suitable number of inputs and/or sum the inputs in any suitable number of stages 208.

In some cases, the output of the adder structure 810 may be a block floating point exponent (e.g., normalization factor), and the final sum 206 may represent a block floating point mantissa. In some embodiments, the block floating point representation may use an integer mantissa. Further, the mantissa may or may not be normalized and may be represented in signed magnitude or other formats.

While the methods involved in addition using the block floating point tree 800 may offer increased accuracy in comparison to some of the other embodiments of adder trees 200 described herein, large trees (e.g., dot products with many elements) may be difficult to implement with this method directly. For example, because there is a large fan-in of results from the XOR gates 802A and the second set of XOR gates 802B into the OR gate 804A and the second OR gate 804B, respectively, and because there is a large fan-out of the select signals from the OR gate 804A and the second OR gate 804B to the muxes 806A and 806B, respectively, the block floating point tree 800 may suffer from long delays, which may reduce performance.

Figure 16:
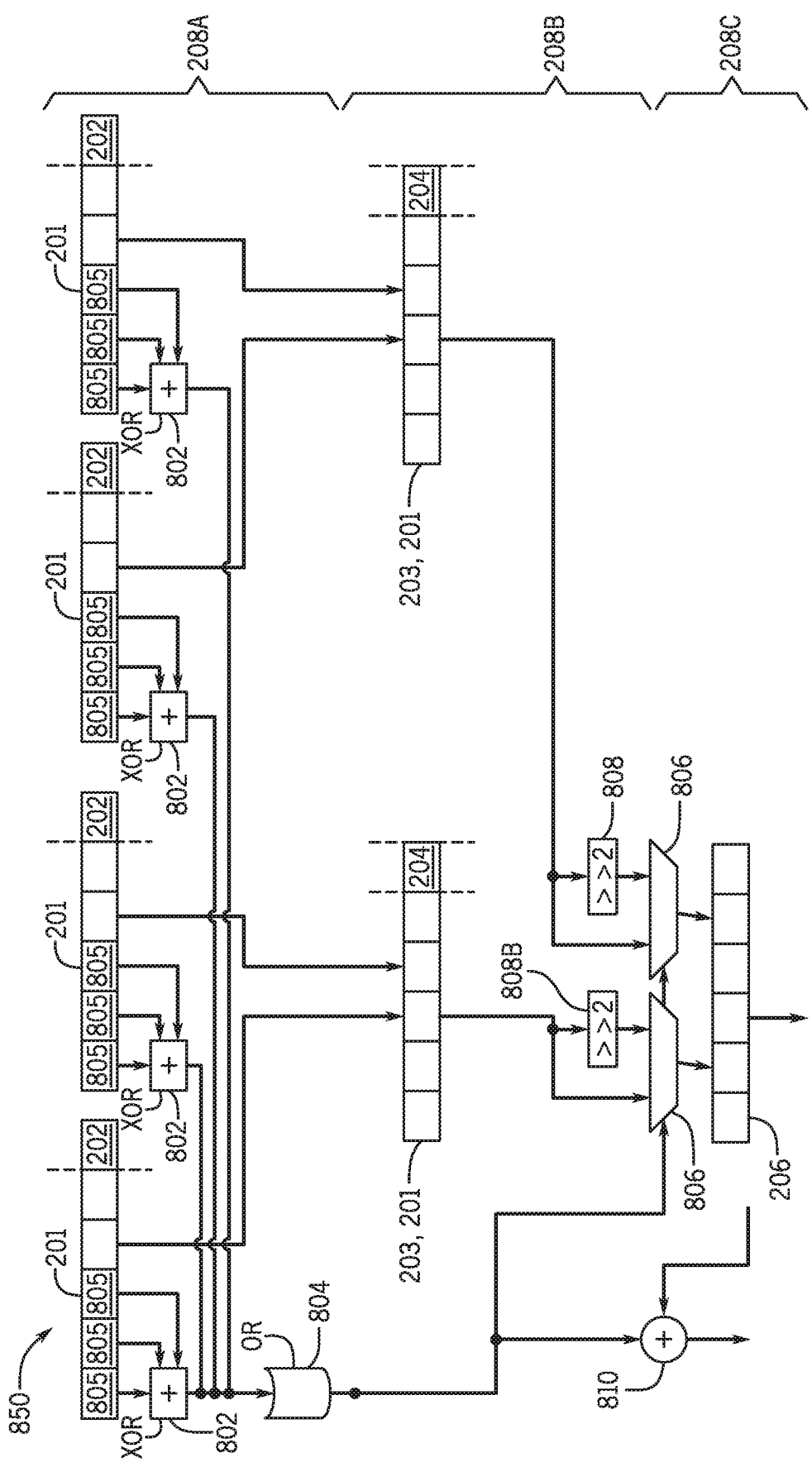
FIG. 16 is a block diagram of a simplified block floating point tree, in accordance with an embodiment.

As such, to resolve complexity involved with these methods, in some embodiments, a stage 208 of the block floating point tree 800 may be skipped. Accordingly, FIG. 16 illustrates a simplified block floating point tree 850 where the operands 201 of the first stage 208A are not adjusted (e.g., selected) before being summed in the second stage 208B. As such, the result of the first OR gate 802A passes directly to the adder structure 810. Further, because a stage 208 is skipped, to suitably adjust the intermediate results 203 in the second stage 208B, the output of the OR gate 804 may select between the intermediate results 203 and the intermediate results right shifted by two bits at the muxes 806. A set of shift blocks 808 may right shift the intermediate results 203 by two bits to simultaneously account for overflow of the first stage 208A and the second stage 208B. Thus, to select the outputs of the muxes 806, the OR gate 804 may receive inputs from the XOR gates 802. In such embodiments, each XOR gate 802 may receive the first three MSBs 805 from a respective operand 201 to enable the OR gate 804 to predict overflow in the first stage 208A and/or the second stage 208B.

In some embodiments, the OR gate 804 may output a select signal including a single bit or set of bits to select the intermediate results 203 (e.g., shifted 0 bits) or the intermediate results right shifted by 2 bits. For example, in some embodiments the select signal may match the value of the selected shift operation (e.g., 0 or 2), which may include the use of two bits, and in other embodiments, the select signal may use a single bit, used to encode a shift of 0 or 2. In any case, the adder structure 810 may still sum all the shift values together and may adjust its output based on the type of select signal used (e.g., a single bit or a set of bits). In some embodiments, the encoded select signals may be accounted for in a different location in the integrated circuit 12.

In addition to or in the alternative from skipping stages 208, as illustrated in FIG. 16, the complexity involved with the methods described with reference to FIG. 15 may be reduced by using a set of block floating point trees 800 and/or a set of simplified block floating point trees 850. For example, a set of operands 201 may be divided into subsets of operands 201, and each of a set of block floating point trees 800 and/or of a set of simplified block floating point trees 850 may receive and sum a different subset of operands 201. As such, the number of operands 201 received by a block floating point tree 800 and/or a simplified block floating point tree 850 may be reduced, thereby reducing the fan-in and fan-out that may cause delays in a large block floating point tree 800. The results of each of the sets of block floating point trees 800 and/or of sets of simplified block floating point trees 850 may then be combined together in a single block floating point representation.

Figure 17:
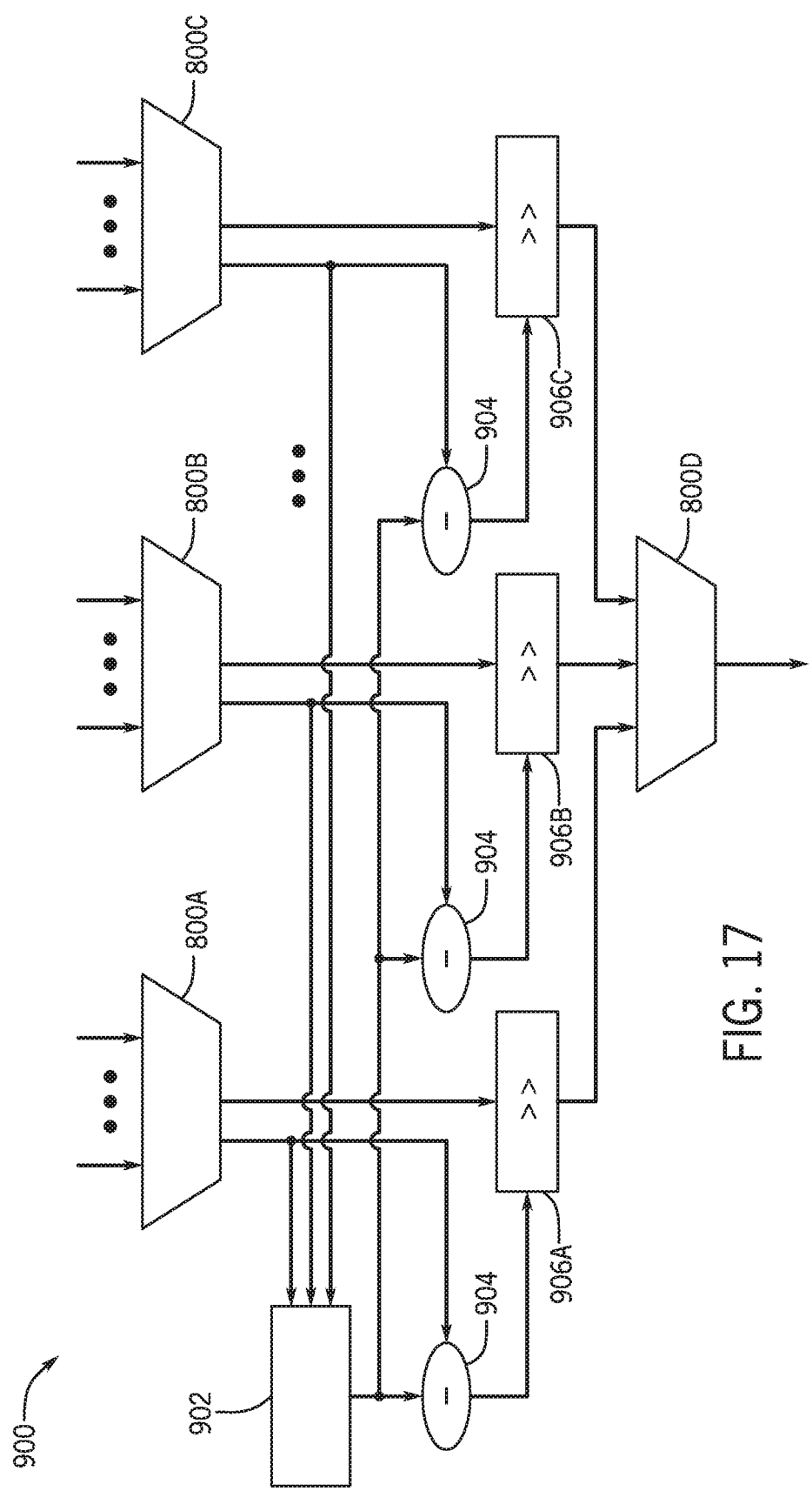
FIG. 17 is a block diagram of a block floating point combination tree, in accordance with an embodiment.

Accordingly, FIG. 17, illustrates an embodiment of a block floating point combination tree 900 that may implement the summation of multiple block floating point trees 800. In the illustrated embodiment, a first block floating point tree 800A, a second block floating point tree 800B, and a third block floating point tree 800C each output both a block floating point exponent and a block floating point mantissa. The block floating point exponents from each block floating point tree (e.g., 800A-C) may be sorted by a circuit 902, which may select and output the maximum block floating point exponent received from the block floating point trees 800A-C. A set of subtractors 904 may couple to the circuit 902 and may then subtract each block floating point exponent from this maximum block floating point exponent. The outputs from the subtractors 904 may then feed into a set of shifters 906A-906C to normalize the block floating point mantissas. As such, each of the shifters 906A-906C may right shift a respective block floating point mantissa of a corresponding block floating point tree (e.g., 800A-800C) a number of bits corresponding to the respective output of the subtractor 904. In some embodiments, for example, the first shifter 906A may not shift the block floating point mantissa of the first block floating point tree 800A at all, as the block floating point exponent of the first block floating point tree 800A may be the maximum block floating point exponent. In such cases, the second shifter 906B may right shift the second block floating point mantissa of the second block floating point tree 800B by three bits, for example, if the subtractor's 904 result of subtracting the block floating point exponent of the second block floating point tree 800B from the maximum block floating point exponent is three. Further, the third shifter 906C may, for example, right shift the third block floating point mantissa of the third block floating point tree 800C by two bits, for example based on the output of the respective subtractor 904 input to the third shifter 906C. The shifters 906A-906C, may be relatively small and/or shallow logic structures, as the block floating point exponents are likely to be small. For example, as described in FIG. 15, the exponents may typically increment by a maximum of 1 at each stage 208 in the block floating point tree 800, so the shift operations to normalize the block floating mantissas are also likely to be small.

Accordingly, each of the block floating point mantissas output by the shifters 906A-906C may be normalized with respect to the maximum block floating point exponent, and as such, the block floating point mantissas may feed into a final block floating point tree 800D to be summed. The final block floating point tree 800D may receive the block floating point mantissas as operands and may generate a final block floating point mantissa and a final block floating point exponent based on the summation of each of the block floating point trees 800A-800C.

Further, in some embodiments, the block floating point combination tree 900 may include any suitable combination of block floating point trees 800 and/or simplified block floating point trees 850. That is, it should be appreciated that FIG. 17 and its description are merely intended to be illustrative and not limiting.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

Embodiments of the Current Application

The following numbered clauses define embodiments of the current application.

Clause A1. An integrated circuit having an adder tree configured to generate a sum based at least in part on an output and an additional value, the adder tree comprising:
  first input circuitry configured to receive a first operand, wherein the first operand comprises a first plurality of bits;
  second input circuitry configured to receive a second operand, wherein the second operand comprises a second plurality of bits;
  soft logic circuitry configured to separate one or more bits from the first plurality of bits to generate a first subset operand and configured to separate an additional one or more bits from the second plurality of bits to generate a second subset operand;
  adder circuitry configured to generate the output based at least in part the first subset operand and the second subset operand; and
  additional circuitry configured to generate the additional value based at least in part on the one or more bits.

Clause A2. The integrated circuit of clause A1, wherein the additional circuitry comprises a trailing adder tree, wherein the trailing adder tree comprises additional adder circuitry configured to generate the additional value based at least in part on a summation of the one or more bits and the additional one or more bits.

Clause A3. The integrated circuit of clause A2, wherein the trailing adder tree is configured to separate a bit from the one or more bits to generate a subset of the one or more bits, and, wherein the additional adder circuitry is configured to generate the additional value based at least in part on a summation of the subset of the one or more bits and the additional one or more bits.

Clause A4. The integrated circuit of any of clauses A1 or 2, wherein the additional circuitry is configured to generate the additional value based in part on a distribution of possible values of the one or more bits.

Clause A5. The integrated circuit of any of clauses A1, 2, or 4, wherein the soft logic circuitry comprises the additional circuitry and is configured to generate the additional value by emulating constant compression of the additional value.

Clause A6. The integrated circuit of any of clauses A1, 2, 4, or 5, wherein the soft logic circuitry comprises a look up table configured to generate the additional value based in part on the one or more bits.

Clause A7. The integrated circuit of any of clauses A1, 2, 4, 5, or 6, wherein the one or more bits comprise one or more least significant bits.

Clause A8. The integrated circuit of any of clauses A1, 2, 4, 5, 6, or 7, wherein the adder tree is configured to append the additional value to the output, prepend the additional value to the output, or a combination thereof.

Clause A9. The integrated circuit of any of clauses A1, 2, 4, 5, 6, 7, or 8, wherein the adder tree is configured to generate the sum based at least in part on a summation of the additional value and the output.

Clause A10. The integrated circuit of any of clauses A1, 2, 4, 5, 6, 7, 8, or 9, wherein the adder tree is configured to perform a multiplication operation of a multiplicand and a multiplier, wherein the first operand comprises the multiplicand, wherein the second multiplier comprises the multiplier, wherein the adder circuitry is configured to generate the output based at least in part on a first partial product of the first subset operand and the second subset operand and a second partial product of the first subset operand and the second subset operand, and, wherein the additional circuitry is configured to generate the additional value based at least in part on a first least significant bit of a third partial product of the multiplicand and the multiplier and a second least significant bit of a fourth partial product of the multiplicand and the multiplier.

Clause A11. The integrated circuit of clauses A10, wherein the sum comprises a product of the multiplication operation, and wherein the additional value comprises a carry-in value to the output.

Clause A12. The integrated circuit of any of clauses A1, 2, 4, 5, 6, 7, 8, 9, or 10 wherein the one or more bits comprise one or more most significant bits.

Clause A13. The integrated circuit of clause A12, wherein the one or more most significant bits comprise one or more sign bits, and, wherein the additional value comprises a sign bit decoded based in part on the one or more bits and the additional one or more bits.

Clause A14. An integrated circuit having an adder tree stage, the adder tree stage comprising:
  adder circuitry, comprising an input and configured to generate an output and a normalization factor based at least in part on the input; and
  input circuitry configured to:
    receive an operand, wherein the operand comprises a plurality of bits;
    determine a most significant bit of the plurality of bits; and
    based at least in part on the most significant bit, selectively route the operand or a subset operand to the input, wherein the subset operand comprises a subset of the plurality of bits.

Clause A15. The integrated circuit of clause A14, wherein, upon selectively routing the subset operand to the input, the input circuitry is configured to increment the normalization factor.

Clause A16. The integrated circuit of clause A14 or 15, wherein the input circuitry is configured to selectively route the operand or the subset operand to an additional input of additional adder circuitry, wherein the additional adder circuitry is disposed within an additional adder tree stage.

Clause A17. The integrated circuit of clause A16, wherein a number of bits in the subset of the plurality of bits is based in part on whether the input circuitry is configured to route the subset operand to the adder circuitry or to the additional adder circuitry.

Clause A18. A tangible, non-transitory, machine-readable medium, comprising machine-readable instructions that, when executed by one or more processors, cause the processors to:
  determine a number of operands to input to an adder tree;
  determine a bit width of each of the operands;
  determine a second bit width of an output of the adder tree;
  determine a number of removable bits to separate from each of the operands based at least in part on the second bit width;
  determine a value based at least in part on an additional value of the removable bits; and
  construct the adder tree configured to:
    receive the operands as inputs;
    separate the removable bits from each of the operands to generate a plurality of subset operands; and
    generate an output based in part on a sum of the subset operands and the value.

Clause A19. The machine-readable medium of clause A18, wherein the machine-readable instructions that, when executed by one or more processors, cause the processors to determine the value based at least in part on a distribution of possible additional values of the removable bits.

Clause A20. The machine-readable medium of any of the preceding clauses, wherein the value comprises a carry-in value to the sum.

Clause B1. An integrated circuit having an adder tree configured to generate a sum based at least in part on an output and an additional value, the adder tree comprising:
  first input circuitry configured to receive a first operand, wherein the first operand comprises a first plurality of bits;
  second input circuitry configured to receive a second operand, wherein the second operand comprises a second plurality of bits;
  soft logic circuitry configured to separate one or more bits from the first plurality of bits to generate a first subset operand and configured to separate an additional one or more bits from the second plurality of bits to generate a second subset operand;
  adder circuitry configured to generate the output based at least in part the first subset operand and the second subset operand; and
  additional circuitry configured to generate the additional value based at least in part on the one or more bits.

Clause B2. The integrated circuit of clause B1, wherein the additional circuitry comprises a trailing adder tree, wherein the trailing adder tree comprises additional adder circuitry configured to generate the additional value based at least in part on a summation of the one or more bits and the additional one or more bits.

Clause B3. The integrated circuit of clause B2, wherein the trailing adder tree is configured to separate a bit from the one or more bits to generate a subset of the one or more bits, and, wherein the additional adder circuitry is configured to generate the additional value based at least in part on a summation of the subset of the one or more bits and the additional one or more bits.

Clause B4. The integrated circuit of any of clause B1 or 2, wherein the additional circuitry is configured to generate the additional value based in part on a distribution of possible values of the one or more bits.

Clause B5. The integrated circuit of any of clause B1, 2, or 4, wherein the soft logic circuitry comprises the additional circuitry and is configured to generate the additional value by emulating constant compression of the additional value.

Clause B6. The integrated circuit of any of clause B1, 2, 4, or 5, wherein the soft logic circuitry comprises a look up table configured to generate the additional value based in part on the one or more bits.

Clause B7. The integrated circuit of any of clause B1, 2, 4, 5, or 6, wherein the one or more bits comprise one or more least significant bits.

Clause B8. The integrated circuit of any of clause B1, 2, 4, 5, 6, or 7, wherein the adder tree is configured to append the additional value to the output, prepend the additional value to the output, or a combination thereof.

Clause B9. The integrated circuit of any of clause B1, 2, 4, 5, 6, 7, or 8, wherein the adder tree is configured to generate the sum based at least in part on a summation of the additional value and the output.

Clause B10. The integrated circuit of any of clause B1, 2, 4, 5, 6, 7, 8, or 9, wherein the adder tree is configured to perform a multiplication operation of a multiplicand and a multiplier, wherein the first operand comprises the multiplicand, wherein the second multiplier comprises the multiplier, wherein the adder circuitry is configured to generate the output based at least in part on a first partial product of the first subset operand and the second subset operand and a second partial product of the first subset operand and the second subset operand, and, wherein the additional circuitry is configured to generate the additional value based at least in part on a first least significant bit of a third partial product of the multiplicand and the multiplier and a second least significant bit of a fourth partial product of the multiplicand and the multiplier.

Clause B11. The integrated circuit of clause B10, wherein the sum comprises a product of the multiplication operation, and wherein the additional value comprises a carry-in value to the output.

Clause B12. The integrated circuit of any of clauses B1, 2, 4, 5, 6, 7, 8, 9, or 10 wherein the one or more bits comprise one or more most significant bits.

Clause B13. The integrated circuit of clause B12, wherein the one or more most significant bits comprise one or more sign bits, and, wherein the additional value comprises a sign bit decoded based in part on the one or more bits and the additional one or more bits.

Clause B14. An integrated circuit having an adder tree stage, the adder tree stage comprising:
  adder circuitry, comprising an input and configured to generate an output and a normalization factor based at least in part on the input; and
  input circuitry configured to:
    receive an operand, wherein the operand comprises a plurality of bits;
    determine a most significant bit of the plurality of bits; and
    based at least in part on the most significant bit, selectively route the operand or a subset operand to the input, wherein the subset operand comprises a subset of the plurality of bits.

Clause B15. The integrated circuit of clause B14, wherein, upon selectively routing the subset operand to the input, the input circuitry is configured to increment the normalization factor.

Clause B16. The integrated circuit of clause B14 or 15, wherein the input circuitry is configured to selectively route the operand or the subset operand to an additional input of additional adder circuitry, wherein the additional adder circuitry is disposed within an additional adder tree stage.

Clause B17. The integrated circuit of clause B16, wherein a number of bits in the subset of the plurality of bits is based in part on whether the input circuitry is configured to route the subset operand to the adder circuitry or to the additional adder circuitry.

Clause B18. A method to construct an adder tree, comprising:
  determining a number of operands to input to an adder tree;
  determining a bit width of each of the operands;
  determining a second bit width of an output of the adder tree;
  determining a number of removable bits to separate from each of the operands based at least in part on the second bit width;
  determining a value based at least in part on an additional value of the removable bits; and
  implementing the adder tree with circuitry configured to:
    receive the operands as inputs;
    separate the removable bits from each of the operands to generate a plurality of subset operands; and
    generate an output based in part on a sum of the subset operands and the value.

Clause B19. The method of clause B18, wherein determining the value comprises determining the value based at least in part on a distribution of possible additional values of the removable bits.

Clause B20. The method of clause B18 or 19, wherein the value comprises a carry-in value to the sum.

Clause B21. A tangible, non-transitory, machine-readable medium, comprising machine-readable instructions that, when executed by one or more processors, cause the processors to perform the method of clause B18, 19, or 20.

Clause C1. An integrated circuit having an adder tree configured to generate a sum based at least in part on an output and an additional value, the adder tree comprising:
  first input circuitry configured to receive a first operand, wherein the first operand comprises a first plurality of bits;
  second input circuitry configured to receive a second operand, wherein the second operand comprises a second plurality of bits;
  soft logic circuitry configured to separate one or more bits from the first plurality of bits to generate a first subset operand and configured to separate an additional one or more bits from the second plurality of bits to generate a second subset operand;
  adder circuitry configured to generate the output based at least in part the first subset operand and the second subset operand; and
  additional circuitry configured to generate the additional value based at least in part on the one or more bits.

Clause C2. The integrated circuit of clause C1, wherein the additional circuitry comprises a trailing adder tree, wherein the trailing adder tree comprises additional adder circuitry configured to generate the additional value based at least in part on a summation of the one or more bits and the additional one or more bits.

Clause C3. The integrated circuit of clause C1 or 2, wherein the additional circuitry is configured to generate the additional value based in part on a distribution of possible values of the one or more bits.

Clause C4. The integrated circuit of clause C1, 2, or 3, wherein the soft logic circuitry comprises the additional circuitry and is configured to generate the additional value by emulating constant compression of the additional value.

Clause C5. The integrated circuit of clause C1, 2, 3, or 4, wherein the soft logic circuitry comprises a look up table configured to generate the additional value based in part on the one or more bits.

Clause C6. The integrated circuit of clause C1, 2, 3, 4, or 5, wherein the adder tree is configured to append the additional value to the output, prepend the additional value to the output, or a combination thereof.

Clause C7. The integrated circuit of clause C1, 2, 3, 4, 5, or 6, wherein the adder tree is configured to generate the sum based at least in part on a summation of the additional value and the output.

Clause C8. The integrated circuit of clause C1, 2, 3, 4, 5, 6, or 7, wherein the adder tree is configured to perform a multiplication operation of a multiplicand and a multiplier, wherein the first operand comprises the multiplicand, wherein the second multiplier comprises the multiplier, wherein the adder circuitry is configured to generate the output based at least in part on a first partial product of the first subset operand and the second subset operand and a second partial product of the first subset operand and the second subset operand, and, wherein the additional circuitry is configured to generate the additional value based at least in part on a first least significant bit of a third partial product of the multiplicand and the multiplier and a second least significant bit of a fourth partial product of the multiplicand and the multiplier.

Clause C9. The integrated circuit of clause C8, wherein the sum comprises a product of the multiplication operation, and wherein the additional value comprises a carry-in value to the output.

Clause C10. The integrated circuit of clause C1, 2, 3, 4, 5, 6, 7, or 8, wherein the one or more bits comprise one or more most significant bits, one or more least significant bits, or a combination thereof.

Clause C11. The integrated circuit of clause C10, wherein the one or more most significant bits comprise one or more sign bits, and, wherein the additional value comprises a sign bit decoded based in part on the one or more bits and the additional one or more bits.

Clause C12. An integrated circuit having an adder tree stage, the adder tree stage comprising:
  adder circuitry, comprising an input and configured to generate an output and a normalization factor based at least in part on the input; and
  input circuitry configured to:
    receive an operand, wherein the operand comprises a plurality of bits;
    determine a most significant bit of the plurality of bits; and
    based at least in part on the most significant bit, selectively route the operand or a subset operand to the input, wherein the subset operand comprises a subset of the plurality of bits.

Clause C13. The integrated circuit of clause C12, wherein, upon selectively routing the subset operand to the input, the input circuitry is configured to increment the normalization factor.

Clause C14. A tangible, non-transitory, machine-readable medium, comprising machine-readable instructions that, when executed by one or more processors, cause the processors to:
  determine a number of operands to input to an adder tree;
  determine a bit width of each of the operands;
  determine a second bit width of an output of the adder tree;
  determine a number of removable bits to separate from each of the operands based at least in part on the second bit width;
  determine a value based at least in part on an additional value of the removable bits; and
  construct the adder tree configured to:
    receive the operands as inputs;
    separate the removable bits from each of the operands to generate a plurality of subset operands; and
    generate an output based in part on a sum of the subset operands and the value.

Clause C15. The machine-readable medium of clause C14, wherein the value comprises a carry-in value to the sum.

What is claimed is:

1. An integrated circuit having an adder tree configured to generate a sum based at least in part on an output and an additional value, the adder tree comprising:
  first input circuitry configured to receive a first operand, wherein the first operand comprises a first plurality of bits;
  second input circuitry configured to receive a second operand, wherein the second operand comprises a second plurality of bits;
  soft logic circuitry configured to separate one or more bits from the first plurality of bits to generate a first subset operand and configured to separate an additional one or more bits from the second plurality of bits to generate a second subset operand;
  adder circuitry configured to generate the output based at least in part the first subset operand and the second subset operand; and
  additional circuitry configured to generate the additional value based at least in part on the one or more bits.

2. The integrated circuit of claim 1, wherein the additional circuitry comprises a trailing adder tree, wherein the trailing adder tree comprises additional adder circuitry configured to generate the additional value based at least in part on a summation of the one or more bits and the additional one or more bits.

3. The integrated circuit of claim 2, wherein the trailing adder tree is configured to separate a bit from the one or more bits to generate a subset of the one or more bits, and, wherein the additional adder circuitry is configured to generate the additional value based at least in part on a summation of the subset of the one or more bits and the additional one or more bits.

4. The integrated circuit of claim 1, wherein the additional circuitry is configured to generate the additional value based in part on a distribution of possible values of the one or more bits.

5. The integrated circuit of claim 1, wherein the soft logic circuitry comprises the additional circuitry and is configured to generate the additional value by emulating constant compression of the additional value.

6. The integrated circuit of claim 1, wherein the soft logic circuitry comprises a look up table configured to generate the additional value based in part on the one or more bits.

7. The integrated circuit of claim 1, wherein the one or more bits comprise one or more least significant bits.

8. The integrated circuit of claim 1, wherein the adder tree is configured to append the additional value to the output, prepend the additional value to the output, or a combination thereof.

9. The integrated circuit of claim 1, wherein the adder tree is configured to generate the sum based at least in part on a summation of the additional value and the output.

10. The integrated circuit of claim 1, wherein the adder tree is configured to perform a multiplication operation of a multiplicand and a multiplier, wherein the first operand comprises the multiplicand, wherein the second operand comprises the multiplier, wherein the adder circuitry is configured to generate the output based at least in part on a first partial product of the first subset operand and the second subset operand and a second partial product of the first subset operand and the second subset operand, and, wherein the additional circuitry is configured to generate the additional value based at least in part on a first least significant bit of a third partial product of the multiplicand and the multiplier and a second least significant bit of a fourth partial product of the multiplicand and the multiplier.

11. The integrated circuit of claim 10, wherein the sum comprises a product of the multiplication operation, and wherein the additional value comprises a carry-in value to the output.

12. The integrated circuit of claim 1, wherein the one or more bits comprise one or more most significant bits.

13. The integrated circuit of claim 12, wherein the one or more most significant bits comprise one or more sign bits, and, wherein the additional value comprises a sign bit decoded based in part on the one or more bits and the additional one or more bits.

* * * * *